(12) United States Patent
Yoda et al.

(10) Patent No.: US 7,081,975 B2
(45) Date of Patent: Jul. 25, 2006

(54) INFORMATION INPUT DEVICE

(75) Inventors: Nobuhisa Yoda, Kamakura (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 10/934,435

(22) Filed: Sep. 7, 2004

(65) Prior Publication Data

US 2005/0024679 A1    Feb. 3, 2005

Related U.S. Application Data

(63) Continuation of application No. 09/664,071, filed on Sep. 18, 2000, now Pat. No. 6,917,438.

(30) Foreign Application Priority Data

Oct. 22, 1999    (JP) .................................. 11-301400

(51) Int. Cl.
*H04N 1/40* (2006.01)
*H04N 1/04* (2006.01)

(52) U.S. Cl. .................... 358/474; 358/448; 382/229

(58) Field of Classification Search ................ 358/400, 358/401, 474, 493, 494, 496, 497, 448, 450, 358/500, 501, 505; 382/312, 313, 315, 317, 382/321, 229
See application file for complete search history.

(56) References Cited

U.S. PATENT DOCUMENTS

| | | | |
|---|---|---|---|
| 6,360,011 B1 * | 3/2002 | Katsumata et al. | ......... 382/181 |
| 6,762,853 B1 | 7/2004 | Takagi et al. | |

FOREIGN PATENT DOCUMENTS

| | | | |
|---|---|---|---|
| JP | 62-267876 A | | 11/1987 |
| JP | 1-94379 A | | 4/1989 |
| JP | 62253032 | * | 4/1989 |
| JP | 6-268786 A | | 9/1994 |
| JP | 406268786 A | * | 9/1994 |
| JP | 9-16717 A | | 1/1997 |
| JP | 09016717 | * | 1/1997 |
| JP | 10-312456 A | | 11/1998 |
| JP | 11-272794 A | | 10/1999 |
| JP | 11272794 | * | 10/1999 |

* cited by examiner

*Primary Examiner*—Jerome Grant, II
(74) *Attorney, Agent, or Firm*—Foley & Lardner LLP

(57) ABSTRACT

The present invention employs an instruction button for inputting an instruction to simultaneously executing registration, in a full-text-search database, of a document scanned by one scanning operation and subjected to OCR processing, and registration of the document in a designated folder contained in a database of a folder tree structure. This single instruction button enables the user to simultaneously register read images in a folder, and text data resulting from OCR processing executed on the read images.

15 Claims, 16 Drawing Sheets

EXAMPLE OF SCREEN FOR PREPARING INPUT PANEL
BUTTON FOR BUSINESS DAILY REPORT

```
PANEL BUTTON PREPARING SCREEN

PANEL NAME:                              YAMADA'S EXCLUSIVE USE
BUTTON NAME:                             BUSINESS DAILY REPORT

DESTINATION FOLDER NAME:                 BUSINESS DAILY REPORT
OCR PROCESSING:                          YES
DICTIONARY TO BE USED FOR
CHARACTER RECOGNITION:                   GENERAL, MEDICAL PRACTICE
CONFIRMATION PRINTING:                   NO
DOCUMENT SEPARATOR RECOGNITION:          YES
DOCUMENT AUTOMATIC DIVISION:             NO
OCR SETTING···LANGUAGE:                  JAPANESE
OCR SETTING···CHARACTER PITCH:           STANDARD
OCR SETTING···PROCESSING RANGE:          ONE PAGE

[ PREPARE ]  [ CANCEL ]
```

FIG. 5                        14

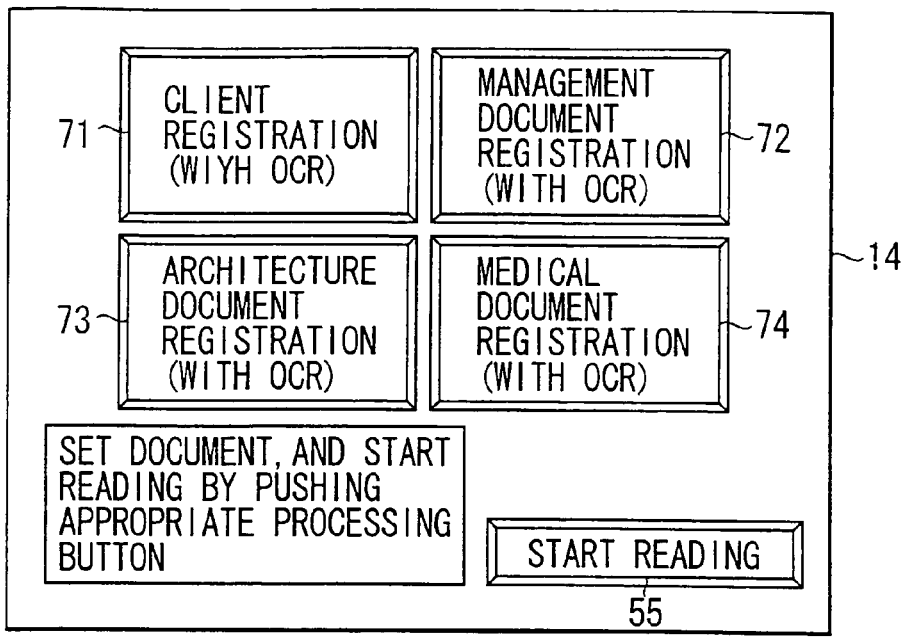

FIG. 7

| BUTTON NUMBER | BUTTON NAME | CONFIR-MATION PRINT-ING | SEPA-RATOR REC-OGNI-TION | DOCU-MENT DIVI-SION | DICTION-ARY FOR USE | OCR LAN-GUAGE | OCR PITCH | OCR PROCES-SING RANGE |
|---|---|---|---|---|---|---|---|---|
| 1 | CLIENT REGISTRA-TION | YES | NO | YES | NAME ADDRESS | JAPA-NESE | FIXED | ALL PAGES |
| 2 | MANAGE-MENT DOCUMENT REGISTRA-TION | YES | YES | YES | MANAGE-MENT ECONOMY | JAPA-NESE | STAND-ARD | ALL PAGES |
| 3 | ARCHITE-CTURE DOCUMENT REGISTRA-TION | YES | NO | YES | ARCHITE-CTURE | ENG-LISH | STAND-ARD | ONLY FIRST PAGE |
| 3 | MEDICAL DOCUMENT REGISTRA-TIONH | YES | NO | YES | MEDICAL PRACTICE | ENG-LISH | STAND-ARD | ALL PAGES |

FIG. 8

PANEL BUTTON PREPARING SCREEN
PANEL NAME:                                    WITH OCR PROCESSING
BUTTON NAME:                                   CLIENT REGISTRATION

DESTINATION FOLDER NAME:                       CLIENT LIST
OCR PROCESSING:                                YES
DICTIONARY TO BE USED
FOR CHARACTER RECOGNITION:                     NAME ADDRESS
CONFIRMATION PRINTING:                         YES
DOCUMENT SEPARATOR RECOGNITION:                NO
DOCUMENT AUTOMATIC DIVISION:                   DIVIDE DOCUMENT IN UINTS
                                               OF 3 PAGES
OCR SETTING···LANGUAGE:                        JAPANESE
OCR SETTING···CHARACTER PITCH:                 FIXED
OCR SETTING···PROCESSING RANGE:                ALL PAGES

[ PREPARE ]   [ CANCEL ]

FIG. 9

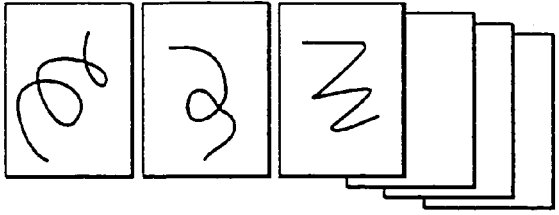

FIG. 10

| DATE | EVENT LEVEL | CONTENTS OF OPERATION | | |
|---|---|---|---|---|
| 1999-10-01@10:10 | NORMALLY TERMINATED | DOCUMENT WAS REGISTERED IN BUSINESS DAILY REPORT (YAMADA). | | |
| 1999-10-01@10:15 | WARNING | SINCE INPUT IMAGE SIZE EXCEEDED ALLOWABLE SIZE (2MB), ONLY OCR PROCESSING RESULT WAS REGISTERED IN BUSINESS DAILY REPORT (YAMADA). | | |
| | | | | |
| | | | | |

FIG. 20

INFORMATION INPUT DEVICE

CROSS-REFERENCE TO RELATED APPLICATIONS

The present application is a Continuation of U.S. application Ser. No. 09/664,071 now U.S. Pat. No. 6,917,438, filed Sep. 18, 2000, which in turn claims benefit of priority to Japanese Patent Application No. 11-301400, filed Oct. 22, 1999, the entire contents of which are incorporated herein by reference.

BACKGROUND OF THE INVENTION

This invention relates to an information input device, such as a scanner, incorporated in a digital copy machine connected to a network, for scanning images on a document, registering, in a database, the images, and retrieving the images registered in the database.

There is a conventional information input device, such as a scanner connected to a network, which has a function of reading document images, registering them in a storage, and retrieving the registered images. For example, a digital copy machine connected to a network can be used as an information input device having such a function. This digital copy machine reads document images using its scanner section for reading images, and registers the read images in a server connected to the network. At this time, the digital copy machine registers the document images and also attribute information corresponding thereto. On the basis of, for example, the attribute information, the document images registered in the server are retrieved.

Japanese Patent Application KOKAI Publication No. 10-312456 discloses a technique for realizing such a function. When, in this technique, a start button incorporated in a digital copy machine has been turned on, image input means and attribute information creating means incorporated in the machine create image data and attribute information, respectively. The image data and the attribute information are transferred by transfer means to storage means incorporated in that server on a network, to which a network address stored in the address storage means of the digital copy machine is assigned. The image data and the attribute information are published by publishing means incorporated in the server, and can be accessed through, for example, the access means of a data-retrieving personal computer on the network.

Further, there is a technique for reading a document while attaching a header sheet and a trailer sheet thereto, and registering the document in an image database and information concerning the document in a registry database.

Japanese Patent Application KOKAI Publication No. 62-267876 discloses a technique for realizing this function. This technique relates to an image registering system for use in an image file apparatus for registering document images. The image file apparatus comprises a registry database for retrieving a registered document, an image database storing images on each registered document, a registry matter database registering connection data to be used for making the registry database correspond to the image database, input means for inputting a document to obtain image data corresponding thereto, recognition means for recognizing alphanumeric characters or other signs from image data, and control means for controlling the aforementioned databases, the input means and the recognition means so as to process data. When registering images on a document, a header sheet and a trailer sheet are respectively provided before the front cover and after the back cover of the document that is in the form of a composite volume and has its pages arranged in ascending order or in descending order, or before the front cover and after the back cover of a document that is in the form of sheets including common data. The header sheet has at least first, second and third symbol frames—the first symbol frame that records a symbol indicating whether the document is in the form of a composite volume or in the form of slips, a symbol indicating whether data is printed on both sides of each page of the document or on one side thereof, a symbol indicating a front side or a back side when data is printed on both sides of each page of the document, or a symbol indicating whether the document pages are arranged in ascending order or in descending order; at least two second symbol frames that record the classification or document number of the document pages; and the third symbol frame that records a symbol indicating whether the sheet is the header sheet or the trailer sheet—. The header sheet, the document in the form of a composite volume or in the form of slips, and the trailer sheet are input in this order via the input means, and the symbols recorded in the symbol frames recognized by the recognition means, thereby making documents, stored in the registry database and the image database, correspond to each other.

In the above-described prior techniques, it is necessary to individually execute processing for registering document images in a voluntarily selected folder, and processing for registering, into a full-text-search database, the result of character recognition processing (OCR processing) executed on the registered document images. Thus, OCR processing is executed after images on each document are registered. Therefore, it is troublesome to execute document image registration and character recognition processing for retrieving document images.

Moreover, when, in the prior technique, executing OCR processing to retrieve a registered document image, operation buttons for setting conditions to increase the efficiency of OCR processing cannot be prepared in advance for various types of document images. Accordingly, when executing OCR processing, an operation button suitable for each document image cannot be selected.

As described above, when, in the prior art, automatically executing OCR processing on scanned document images, the user must operate various setting means for enhancing OCR processing, in addition to the scanning/inputting operation of document images. This means that time and effort are required for correction executed after the scanning operation, and high character recognizing accuracy cannot be obtained.

BRIEF SUMMARY OF THE INVENTION

Since, when automatically executing the character recognition processing as described above, various types of setting means for enhancing character recognition processing are separated from document image input means, time and effort are required to register a document image or to execute correction after scanning the document image, and/or appropriate character recognition accuracy cannot be obtained. The present invention has been developed to solve these problems, and aims to provide an information input device which is easy for the user to use and capable of efficiently retrieving a registered document image with maximum character recognition accuracy.

To attain the aim, there is provided an information input device comprising: an image reading section for reading images on each of documents; a character recognition section for subjecting, to character recognition processing, the images read by the image reading section; a display section for displaying various types of instruction buttons; a management section for managing set contents corresponding to each of the instruction buttons displayed on the display section, the set contents including a destination of registration of the images read by the image reading section, and contents of processing executed on the images by the character recognition section; and a control section for executing control, when one of the instruction buttons has been designated, on the basis of the set contents corresponding to the one of the instruction buttons and managed by the management section, the control section controlling the image reading section so as to read the images, controlling the character recognition section so as to execute character recognition processing on the read images, and simultaneously registering the read images and a result of character recognition processing executed on the read images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view illustrating an example of a display screen for preparing an instruction button;

FIG. 7 is a view showing an example of a display screen displaying other instruction buttons;

FIG. 8 is a view useful in explaining the contents of a management table;

FIG. 9 is a view illustrating an example of a display screen for preparing an instruction button for each purpose;

FIG. 10 is a view showing an example of a screen for retrieving a document image;

FIG. 20 is a view showing an example of data stored in an operation log.

DETAILED DESCRIPTION OF THE INVENTION

First to eighth embodiments of the invention will be described with reference to the accompanying drawings.

Figure 1:
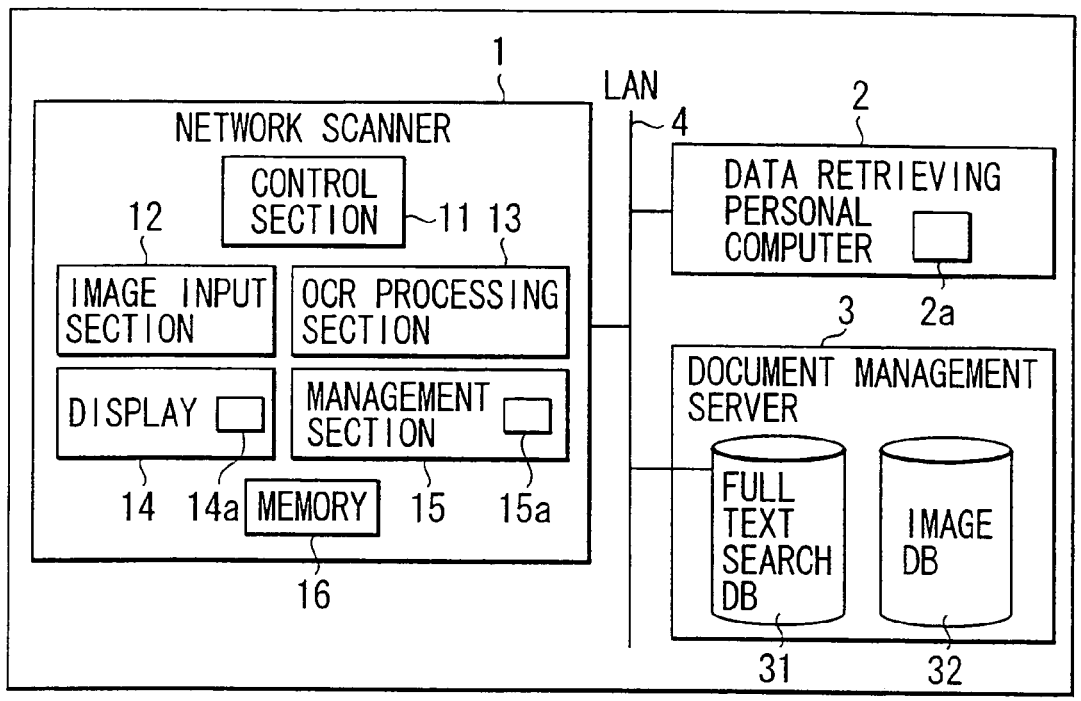
FIG. 1 is a schematic block diagram illustrating a network system to which first to seventh embodiments of the invention are applicable.
Figure 2:
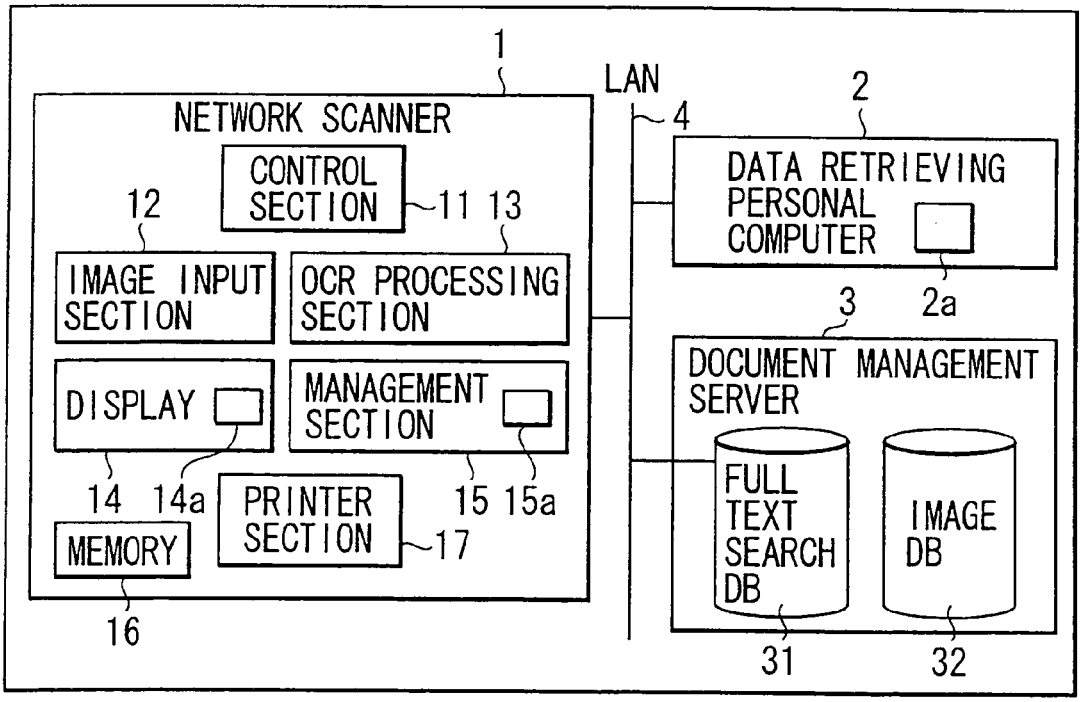
FIG. 2 is a schematic block diagram illustrating another network system to which the first to seventh embodiments of the invention are applicable.

FIGS. 1 and 2 show examples of network systems which include an information input device according to each of first to eighth embodiments of the invention. Each network system comprises a network scanner (digital copier) 1 as an information input device, a personal computer for data retrieval (external device) 2, a document management server 3, and a LAN 4.

As shown in FIG. 1, the network scanner 1 includes a control section 11, an image input section (image reading section) 12, an OCR processing section (character recognition section) 13, a display 14, a management section 15, a memory 16, etc. The network scanner 1 is a device for scanning images on a document made of, for example, paper, to create electronic image data.

The control section 11 controls the entire scanner. The image input section 12 optically scans a document made of, for example, paper to thereby read images thereon. The OCR processing section 13 executes character recognizing processing (OCR processing) on a character or a symbol from the read images. The display 14 is provided on an operation panel (not shown) and contains a touch panel 14a. The display 14 displays guidance on operation, the set contents, or instruction buttons for inputting operation instructions. The management section 15 has a management table 15a for managing, for example, the set contents for designating processing assigned to each instruction button. The memory 16 temporarily stores various types of data, or stores image data, text data, etc. transmitted from an external device via a network.

Although the network scanner 1 corresponds to the image input device in FIG. 1, it may be a device, such as a digital copy machine 1 as shown in FIG. 2, which has an image input function, a printing function, etc. In this case, as shown in FIG. 2, the digital copy machine 1 mainly includes a printer section 17 for forming an image on an image forming medium such as a copy sheet of paper, in addition to the structural elements of the network scanner shown in FIG. 1.

The network scanner (digital copy machine) 1 is connected to a LAN 4, to which a document management server 3 and a personal computer 2 for data retrieval are connected. The personal computer 2 has a display 2a, an operation section, etc., and is used to retrieve document images from the document management server 3.

The document management server 3 is a device for storing and managing document images input from the network scanner 1. The document management server 3 includes an image database (DB) 32 for managing images using folders, and a full-text-search database (DB) 31 for storing text data. The image database 32 manages each document image as a document metaphor in a folder, and folders used therein are arranged in a tree structure.

The full-text-search database 31 stores text data which comprises character codes indicating characters or character candidates, and which are obtained as a result of OCR processing executed on images. The text data stored in the full-text-search database 31 is used when the personal computer 2 executes data retrieval depending upon whether or not a keyword is included in the text data.

The first embodiment of the invention will now be described.

Figure 3:
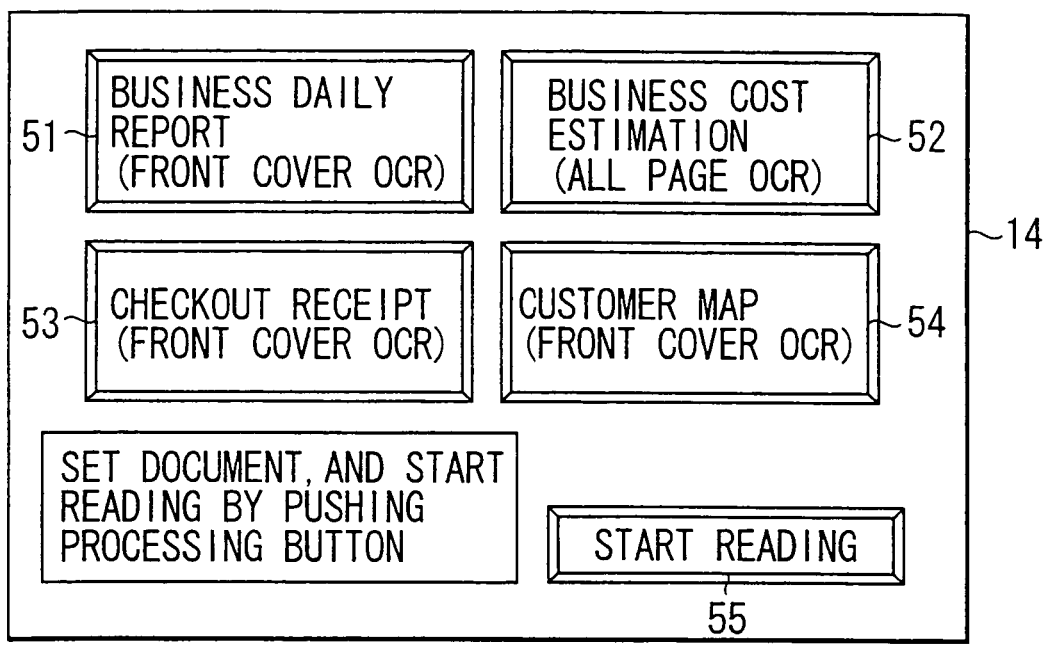
FIG. 3 is a view showing an example of a display screen displaying instruction buttons.

FIG. 3 shows an example of a display screen of the display 14 of the network scanner 1, which displays instruction buttons realized by the touch panel 14a. In this example, the display 14 displays four instruction buttons 51–54, a read start button 55 for inputting an instruction to start image reading, and operation guidance.

The instruction buttons 51–54 are used to input an instruction to execute processing based on the set contents managed by the management table 15a. Specifically, when each of the instruction buttons 51–54 has been touched, images on a document are scanned and input (read) on the basis of the set contents in the management table 15a, thereby executing COR processing on the input images and registering the input images and the OCR processing result.

The instruction button 51 is labeled "BUSINESS DAILY REPORT (FRONT COVER OCR)". This button is used to execute the process of registering the images on a scanned document in a folder labeled "BUSINESS DAILY REPORT" and contained in the image database 32, and the process of executing OCR processing on only the front cover (1 page) of the scanned document and then registering the OCR processing result in the full-text-search database 31.

Accordingly, when the instruction button 51 is touched, images on the scanned document are registered as images on a new document in the folder labeled "BUSINESS DAILY REPORT", and also subjected to OCR processing. This processing result is registered in the full-text-search database 31.

The instruction button 52 is labeled "BUSINESS COST ESTIMATION (ALL PAGE OCR)". This button is used to register images on a scanned document as images on a new document in the folder labeled "BUSINESS COST ESTIMATION (ALL PAGE OCR)", and execute OCR processing on all pages of the document, thereby registering the OCR processing result in the full-text-search database 31.

The instruction button 53 is labeled "CHECKOUT RECEIPT (FRONT COVER OCR)" and used to register a checkout receipt. This button is used to register images on a scanned document as images on a new document in a folder labeled "CHECKOUT RECEIPT", and executes OCR processing on only the front cover (1 page) of the scanned document and then registering the OCR processing result in the full-text-search database 31.

The instruction button 54 is labeled "CUSTOMER MAP (FRONT COVER OCR)" and used to register a customer map in the same manner as in the case of the instruction buttons 51–53. This button is used to register images on a scanned document as images on a new document in a folder labeled "CUSTOMER MAP", and executes OCR processing on only the front cover (1 page) of the scanned document and then registering the OCR processing result in the full-text-search database 31.

Further, as shown in FIG. 3, a lower left portion of the display screen displays an instruction message for the user.

In the example shown in FIG. 3, the operation guidance "please set a document and push the process button to start its reading" is displayed. In addition, the instruction button 55 labeled "START READING" to start reading of document images and to register them on the basis of the set contents in the selected process button is provided at a lower right portion of the display screen.

Using the above display screen, the user selects one of the instruction buttons 51–54 in accordance with a destination into which a to-be-input document should be registered, and pushes the instruction button 55 to start the process. The range of pages of a to-be-read document, which are subjected to OCR processing, is set in the management table 15a of the management section 15 for each destination of registration corresponding to the instruction buttons 51–54.

Figure 4:
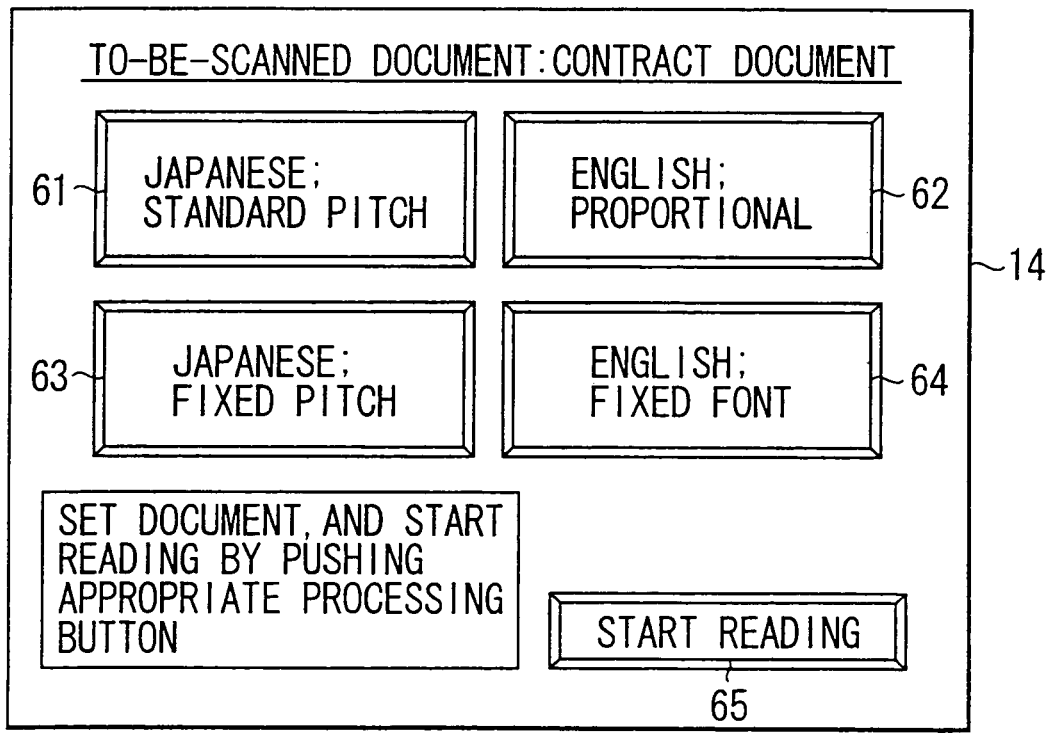
FIG. 4 is a view showing an example of a display screen displaying other instruction buttons.

FIG. 4 shows an example of a display screen at which an appropriate instruction button can be selected in accordance with the language or the font of the printed characters of a to-be-input document. As shown in FIG. 4, instruction buttons 61–64 are supposed to be selectively used when the destination folder in which a to-be-scanned document is registered is a "CONTRACT DOCUMENT". The procedure after the document is set and until it is registered is similar to that shown in FIG. 2.

If, for example, the to-be-scanned contract document is written in Japanese, and the character pitch is fixed, the instruction button 61 labeled "JAPANESE; FIXED PITCH" is selected. In the case of a Japanese contract document using a character pitch other than the fixed one, the instruction button 62 labeled "JAPANESE; STANDARD PITCH" is selected.

On the other hand, if the to-be-scanned contract document is written in English, and the letter pitch is proportional, the instruction button 63 labeled "ENGLISH; PROPORTIONAL" is selected. In the case of an English contract document using a fixed letter pitch, the instruction button 64 labeled "ENGLISH; FIXED FONT" is selected.

Selection of an instruction button suitable for the feature of a to-be-input document enables OCR processing suitable for input document images, thereby enhancing the efficiency of recognition of characters (letters).

In the first embodiment, the instruction buttons, which are realized on the display 14 using the touch panel 14a, can be prepared voluntarily by the user, using a preparation screen. FIG. 5 illustrates an example of data input in an instruction button preparation screen. More specifically, FIG. 5 shows a preparation screen for preparing the "BUSINESS DAILY REPORT" button shown in FIG. 3. The contents set for the instruction button using the preparation screen are written as the attribute data of the button into the management table 15a of the management section 15, and managed by it.

As is shown in FIG. 5, the preparation screen of the instruction button displays setting items such as "PANEL NAME", "BUTTON NAME", "REGISTRATION DESTINATION FOLDER NAME", "WHETHER OR NOT OCR PROCESSING IS EXECUTED", "DICTIONARY USED FOR CHARACTER RECOGNITION", "PRINTING FOR CONFIRMATION", "DOCUMENT SEPARATOR RECOGNITION", "DOCUMENT AUTOMATIC SEPARATION", "LANGUAGE FOR OCR SETTING", "CHARACTER PITCH FOR OCR SETTING", "RANGE OF PROCESSING FOR OCR SETTING", etc.

The item "PANEL NAME" is for setting the name of a panel (the name of a display screen) to which the to-be-prepared instruction button belongs. The item "BUTTON NAME" is for setting the name of the to-be-prepared instruction button, and the button name is displayed as the instruction button.

The item "REGISTRATION DESTINATION FOLDER NAME" is set for designating the name of a folder in which images input using a selected instruction button are registered. The item "WHETHER OR NOT OCR PROCESSING IS EXECUTED" designates whether or not the input document images should be subjected to OCR processing.

The item "DICTIONARY USED FOR CHARACTER RECOGNITION" is set for designating a dictionary to be used in the case of executing OCR processing. The item "PRINTING FOR CONFIRMATION" is set for designating whether or not a registered document image should be printed for confirmation. The item "DOCUMENT SEPARATOR RECOGNITION" is set for designating whether or not the end of each of a plurality of documents input at one time should be automatically recognized by recognizing each separator.

The item "DOCUMENT AUTOMATIC SEPARATION" is set for designating whether or not the documents should be automatically separated and registered when a separator has been detected. The items "LANGUAGE FOR OCR SETTING", "CHARACTER PITCH FOR OCR SETTING" and "RANGE OF PROCESSING FOR OCR SETTING" are set for designating the language, the character pitch and the range of the to-be-processed pages of the document as configuration elements for OCR processing, respectively.

Figure 6:
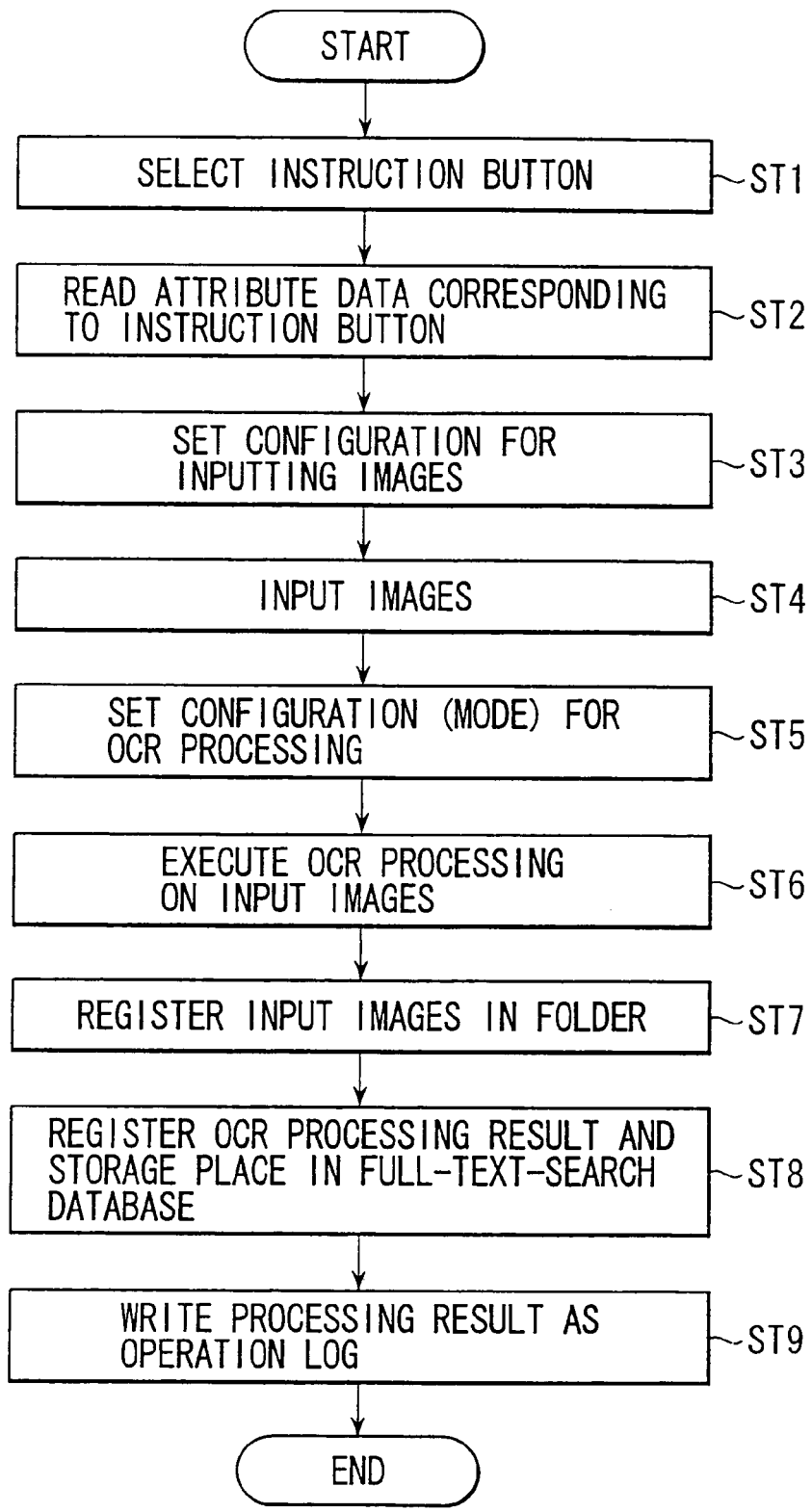
FIG. 6 is a flowchart illustrating the flow of processing executed in the first embodiment of the invention.

FIG. 6 is a flowchart useful in explaining processing executed in the first embodiment. Specifically, FIG. 6 illustrates the flow of processing executed from the scanning of a document to the registration of its images in a folder in accordance with an instruction using an instruction button as shown in FIG. 3 or 4.

First, the user designates the name of a panel (the name of a display screen) to which a to-be-used instruction button belongs. Then, the instruction buttons that belong to the panel designated by the user through the touch panel 14a of the display 14 are displayed. The user selects one of the instruction buttons (step ST1). Subsequently, the control section 11 reads attribute data corresponding to the selected instruction button from the management table 15a of the management section 15 (step ST2).

The control section 11 then sets a configuration for inputting images on the basis of data read from the management table 15a (step ST3). After the user touches the read start button, the control section 11 starts input of images through the image input section 12 (step ST4).

Further, the control section 11 sets a configuration (mode) for OCR processing on the basis of the set contents of the selected instruction button, which concern OCR processing and are read from the management table 15a of the management section 15 (step ST5). Upon inputting images, the control section 11 executes OCR processing on the input images under the set OCR processing configuration (step ST6).

At this time, the range of execution of OCR processing is determined based on the contents set in the management table 15a. For example, the range of execution of OCR processing, such as the full text (all pages), only the front cover (the first page), or pages between designated pages, is set for a plurality of read images.

After OCR processing is executed on the read images, the control section 11 registers them in a folder contained in the image database 32 and designated in the management table 15a in accordance with the selected instruction button (step ST7). Subsequently, the control section 11 registers, in the full-text-search database 31, text data (a text document) resulting from OCR processing, together with information indicating the image storing place (folder) (step ST8).

After registering the OCR processing result and the images, the control section 11 writes the processing result into an operation log table 15b described later (step ST9), and finishes the process related to the selected instruction button.

As described above, the invention is characterized by the instruction button that is provided for simultaneously executing, for a document scanned by one scanning operation, registration, in the full-text-search database, data obtained by subjecting images on the document to OCR processing, and registration of the images on the document in a data retrieving database of a folder tree structure after designation of a folder as a destination of registration.

Thus, registration of read images in a folder and registration of text data obtained by executing OCR processing on the read images can be simultaneously executed using one instruction button.

Moreover, when retrieving a registered document, even if character recognition is executed partially erroneously during the execution of OCR processing, it does not significantly influence the retrieval of the document and hence the retrieval can be executed efficiently, since a keyword for retrieval is searched over the entire text data.

Also, in addition to the full text search of the text data by OCR processing, document images can be also retrieved by folder retrieval. This enables the entire system to reliably retrieve document images.

A second embodiment of the invention will now be described.

In the second embodiment, a dictionary used during character recognition processing is assigned to an instruction button. This enables recognition of characters on a scanned document using an optimal dictionary for the document based on the instruction button touched by the user when scanning the document.

In OCR processing, a method (sentence analysis method) for analyzing, in addition to recognition processing for analyzing the shape of each character, a word or a sentence constructed by recognized characters to select an optimal one of character candidates is often employed in order to finally correctly recognize each character. In this sentence analysis method, it is important to use a dictionary corresponding to the contents of a to-be-recognized document.

For example, in a document reciting addresses or expertise information concerning, for example, medical practice, many unusual words are used, and hence it is possible that the document will not correctly be recognized if a usual dictionary is used. If, in this case, a dictionary corresponding to the document is used, the efficiency of recognition can be enhanced.

FIG. 7 shows an example of a display screen displaying instruction buttons 71–74 that correspond to respective dictionaries used when input document images are subjected to OCR processing. If the instruction button 71 labeled "CLIENT REGISTRATION" is used when scanning a document such as an address list, characters of the address list are recognized using a dictionary concerning addresses and names. Further, when scanning a management document using the instruction button 72 labeled "MANAGEMENT DOCUMENT REGISTRATION", a dictionary concerning management or economy is used.

The instruction buttons 71–74 shown in FIG. 7 are managed by a management table 15a as shown in FIG. 8. As shown in FIG. 8, the management table 15a stores items used for OCR processing, such as "BUTTON NUMBER", "BUTTON NAME", "PRINTING FOR CONFIRMATION", "SEPARATOR RECOGNITION", "DOCUMENT SEPARATION", "USED DICTIONARY", "OCR LANGUAGE", "OCR PITCH" and "OCR TARGET RANGE".

The item "USED DICTIONARY" is used to designate dictionaries corresponding to respective documents. For example, a dictionary concerning names and addresses is set for the instruction button 71 labeled "CLIENT REGISTRATION". Similarly, a dictionary concerning management and economy is set for the instruction button 72 labeled "MANAGEMENT DOCUMENT REGISTRATION". A dictionary concerning architecture is set for the instruction button 73 labeled "ARCHITECTURE DOCUMENT REGISTRATION". A dictionary concerning medical practice is set for the instruction button 74 labeled "MEDICAL DOCUMENT REGISTRATION".

FIG. 9 illustrates an example of a display screen for preparing the instruction button 71 labeled "CLIENT REGISTRATION". In this example, similar items to those in the screen of FIG. 5 are set. Further, in the case of FIG. 9, "WITH OCR PROCESSING" is designated as the panel name, "CLIENT REGISTRATION" as the button name, "CLIENT LIST" as the name of a folder as the destination of registration, and "DICTIONARIES CONCERNING NAMES AND ADDRESSES" as the dictionaries used for character recognition. The contents set for each instruction button are reflected in the contents in the management table 15*a* of the management section 15 as shown in FIG. 8.

FIG. 10 illustrates an example of a display screen of the display 2*a* of the data retrieving personal computer 2, used when a document registered in the document management server 3 is retrieved using the computer 2. Using the display 2*a* of the personal computer 2, the user can retrieve a document, registered in the document management server 3, from the image database 32 having a folder tree structure, and also from the full-text-search database 31 that stores text data corresponding to the document.

In the retrieval using the folder tree structure, the folders registered in the image database 32 are displayed in a tree structure on the display screen of the personal computer 2, thereby enabling the user to select a target folder from the displayed folders.

Further, in the full text (natural language) retrieval, the user can retrieve, using the full-text-search database 31, the entire text data corresponding to images on a target document simply by inputting a voluntarily selected word (a character, a word, a sentence, etc.).

In other words, when the user has input, to the data retrieving personal computer 2, a word or a sentence as a keyword for retrieving a target document, the personal computer 2 retrieves the keyword from the entire text data registered in the full-text-search database 31 and resulting from OCR processing, thereby displaying, as a retrieval result, a list of document images that contain the keyword.

At this time, those of the document images, which contain lots of keywords, may be determined to be a retrieval result, or may be arranged in order in accordance with the number of keywords contained therein.

When document images have been obtained by the retrieval using the folder tree structure or by the retrieval using the full-text-search function, the data retrieving personal computer 2 displays a list of document images as a retrieval result, as is shown in FIG. 10.

Thus, images on a desired document can be retrieved on the basis of the name of a folder or a management structure, in which the document images is registered, and can be retrieved using a keyword contained therein.

Figure 11:
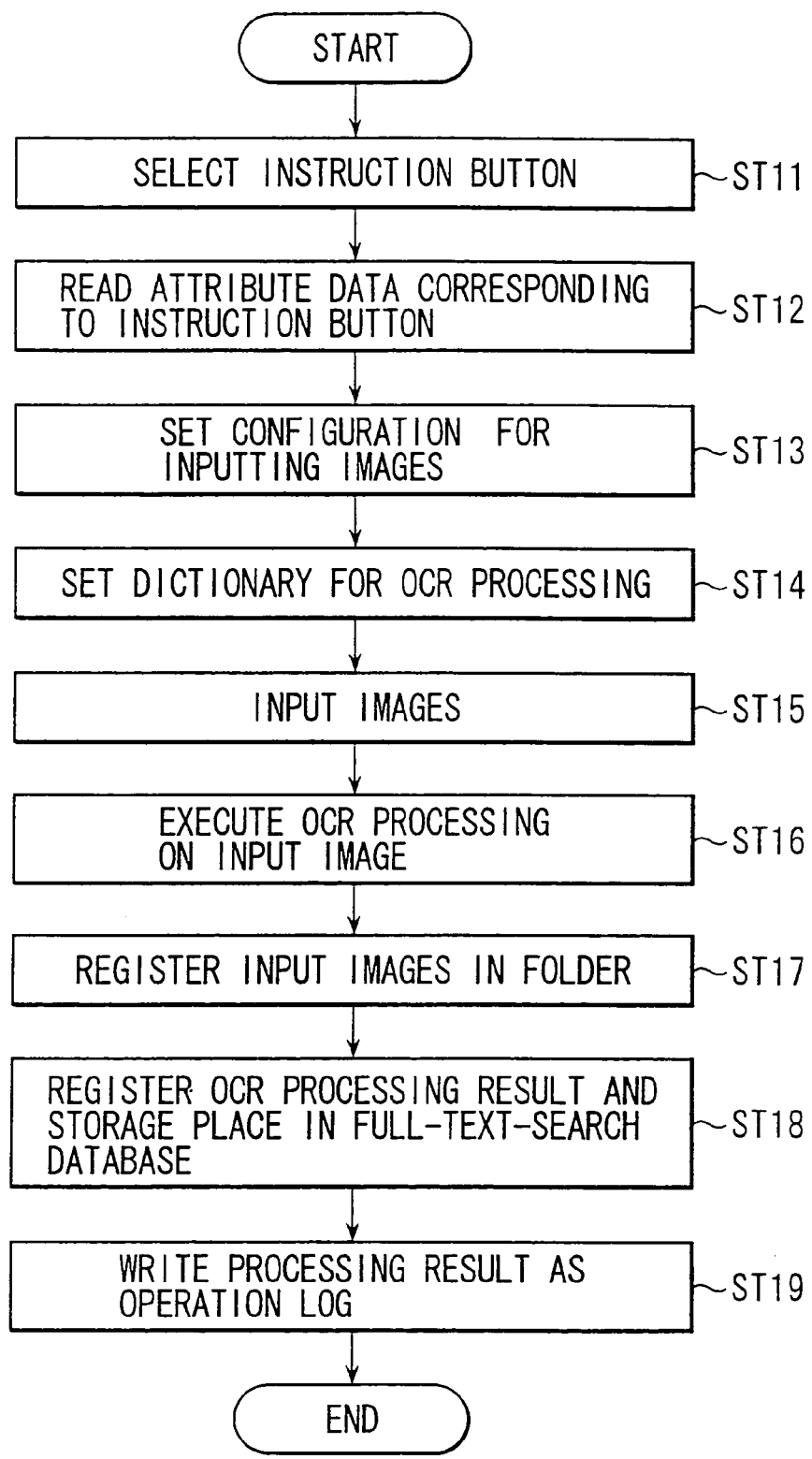
FIG. 11 is a flowchart illustrating the flow of processing executed in the second embodiment of the invention.

FIG. 11 is a flowchart useful in explaining the process executed in the second embodiment.

First, the user designates the name of a panel (display screen) to which a to-be-used instruction button belongs, by touching the touch panel 14*a* of the display 14. Then, the instruction buttons belonging to the designated panel are displayed on the display 14. The user selects the to-be-used instruction button from the screen (step ST11). Subsequently, the control section 11 reads attribute data corresponding to the selected instruction button from the management table 15*a* of the management section 15 (step ST12).

The control section 11 sets a configuration for inputting images on the basis of the contents read from the management table 15*a* (step ST13). The control section 11 further sets a dictionary for the OCR processing configuration (mode) and OCR processing itself on the basis of the contents read from the management table 15*a* (step ST14).

Then, the user pushes the instruction button for inputting an instruction to start data reading, whereby the control section 11 controls the image input section 12 so as to start input of images (step ST15).

Upon inputting the images, the control section 11 controls the OCR processing section 13 so as to execute OCR processing on the input images under the configuration set for OCR processing, using the dictionary set at the step ST14 (step ST16).

After OCR processing on the read images is finished, the control section 11 registers the images in a folder contained in the image database 32 and designated by the management table 15*a* in accordance with the instruction button (step ST17). Subsequently, the control section 11 registers, in the full-text-search database 31, text data (a text document) resulting from OCR processing, together with information indicating the storing place (folder) of the images (step ST18).

After registering the OCR processing result and the images, the control section 11 writes the processing result into an operation log table 15*b* described later (step ST19), and finishes the process related to the pushed instruction button.

As described above, the conditions for OCR processing executed on document images, and a folder as the destination of registration of the document images are set in relation to the pushed instruction button, whereby an appropriate one of the instruction buttons is used so that OCR processing will be executed under OCR conditions corresponding to the type of a to-be-processed document.

As a result, various conditions for OCR processing corresponding to various types of to-be-processed documents can be set in relation to the instruction buttons, and the accuracy of OCR processing can be enhanced when an appropriate instruction button is used.

Further, the OCR conditions are set in accordance with a language such as Japanese, English, etc., a character pitch such as a standard pitch, a fixed pitch, etc., which are used for OCR processing, or in accordance with the type of a to-be-registered document such as an address list, a medical practice document, a technical document, etc.

Accordingly, only one instruction button enables simultaneous registration of document images and the result of OCR processing executed on the document images, and also enables realization of highly accurate OCR processing according to the type of a to-be-registered document.

In addition, the dictionary used for OCR processing, included in the OCR processing conditions, is set in accordance with the type of a to-be-registered document. This enables OCR processing of high character recognition accuracy according to the type of the to-be-registered document.

A third embodiment of the invention will be described.

In the third embodiment, a device is supposed, which is used as a network scanner shown in FIG. 2 and has two functions of image printing and image input as in the digital copy machine 1. This embodiment is characterized in that the user transmits, via a local area network (LAN) to the digital copy machine 1, a page to be subjected to OCR processing, thereby attaching the transmitted page as a to-be-scanned document image to images read by the digital copy machine 1.

The digital copy machine 1 has a function called "private printing". This function is for printing an image, transmitted from an external device to the copy machine 1, when the user has instructed the machine to print the image.

Specifically, when the user has transmitted, from an external device such as a personal computer to the digital copy machine 1, image data in the form of a character code, together with an instruction to execute private printing, the digital copy machine 1 converts, into image data, the character code transmitted from the external device, thereby temporarily storing it in the memory 16. After that, if the user instructs the digital machine 1 to print the image data, using the operation panel of the digital machine 1, the image data stored in the memory 16 is printed by the printer section 17.

In the third embodiment, the private printing function is used to attach an image, transmitted from an external device, to images read by the digital copy machine 1 as the network scanner 1, thereby forming a document. After that, the obtained document images and text data obtained by subjecting the document to OCR processing are simultaneously registered.

Figure 12:
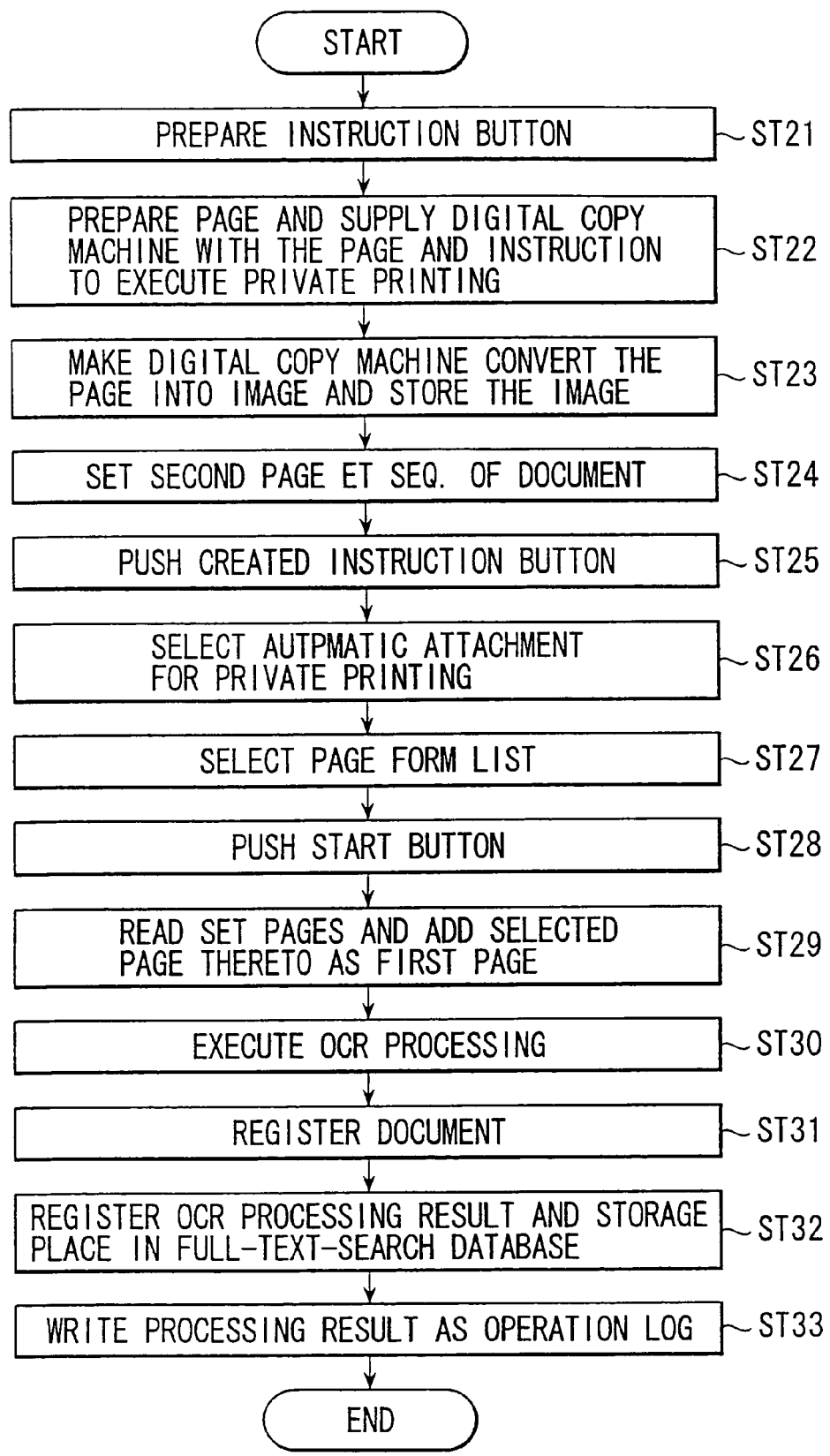
FIG. 12 is a flowchart illustrating the flow of processing executed in the third embodiment of the invention.

FIG. 12 is a flowchart useful in explaining the flow of processing executed in the third embodiment. Referring to this flowchart, a description will be given of the operation of transmitting a page as the front cover of a document to the digital copy machine 1 using the private printing function, and causing the copy machine 1 to read document images as the second page, et seq.

First, the user prepares an instruction button (panel button) used for executing OCR processing and registering resultant document images (step ST21). The user also creates a page to be used as the front cover of the document images, using, for example, their own personal computer (data retrieving personal computer) 2 as an external device connected to the LAN 4. This page is a page on which, for example, a sentence input by the user is printed, and data thereon is transmitted to the outside in the form of a character code.

After creating the page as the front cover, the user issues an instruction to execute private printing of the page, using the data retrieving personal computer 2 (step ST22). Subsequently, the personal computer 2 transmits, to the digital copy machine 1, both an instruction to execute private printing, and the page as the target of private printing converted in the form of a character code.

When the digital copy machine 1 has received the page as the target of private printing, the control section 11 converts the received character code of the page into image data and stores it in the memory 16 (step ST23).

After that, the user directly sets, at the image input section 12 of the digital copy machine 1, to-be-scanned and registered document pages after the front page (step ST24). Before scanning the pages, the user selects the instruction button prepared at the step ST21 (step ST25)

Then, the control section 11 displays, on the display 14, guidance "AUTOMATIC ATTACHMENT FOR PRIVATE PRINTING" and the selected instruction button. When the user has selected "AUTOMATIC ATTACHMENT FOR PRIVATE PRINTING" (step ST26), the control section 11 displays a list of images that can be subjected to private printing. The user selects one of the listed images, which they would like to make the front page, by touching the touch panel 14a (step ST27). After the user pushes the read start button (step ST28), the control section 11 reads the set document pages.

After reading the set document pages, the image selected at the step ST27 from the document images that can be subjected to private printing is electronically added as the front cover page of the document images (step ST29). The control section 11 controls the OCR processing section 13 so as to execute OCR processing on the document images within the page range designated in advance when the instruction button is prepared (step ST30).

After finishing OCR processing on the document images, the control section 11 registers the document images in a folder contained in the image database 32 and designated by the instruction button (step ST31). Further, the control section 11 registers, in the full-text-search database 31, both a text document resulting from OCR processing, and information concerning the image storage place (folder) (step S32). After finishing the registration of the document images and the OCR processing result, the control section 11 writes the processing result as an operation log into the management section 15 (step ST33), thereby finishing processing concerning the instruction button.

In the third embodiment, a character code, which indicates data on a page to be used as the front cover of a document and is transmitted from an external device using the private printing function, is converted into image data, and is attached as the first page to the other document images and subjected to OCR processing. However, this operation may be modified such that page data constructed by the character code transmitted for printing from the external device is directly registered in the full-text-search database 31, without being converted into image data.

On the other hand, when registering, in the image database 32, the character code transmitted for printing from the external device, the code is converted into image data.

As described above, in the third embodiment, an instruction to print only the front cover of a document is input from an external device, using the private printing mode, thereby electronically attaching an image, instructed to print as the front cover of the document, to to-be-registered document images, and scanning the other pages of the document. Those of the thus-obtained document images, which are included within the page range set in accordance with the instruction button, are subjected to OCR processing, whereby the document images are registered in a folder, and text data resulting from OCR processing is registered in the full-text-search database.

Thus, a page created by, for example, an external device can be attached to document images actually read by the scanner, and registered as a document image. This can omit the operation of printing an image of a to-be-attached page on, for example, a sheet of paper, and then reading the printed image. As a result, paper and time can be saved.

A fourth embodiment of the invention will be described.

The fourth embodiment is characterized in that information concerning the instruction button used to scan a document is attached as text data to an OCR processing result and registered.

Figure 13:
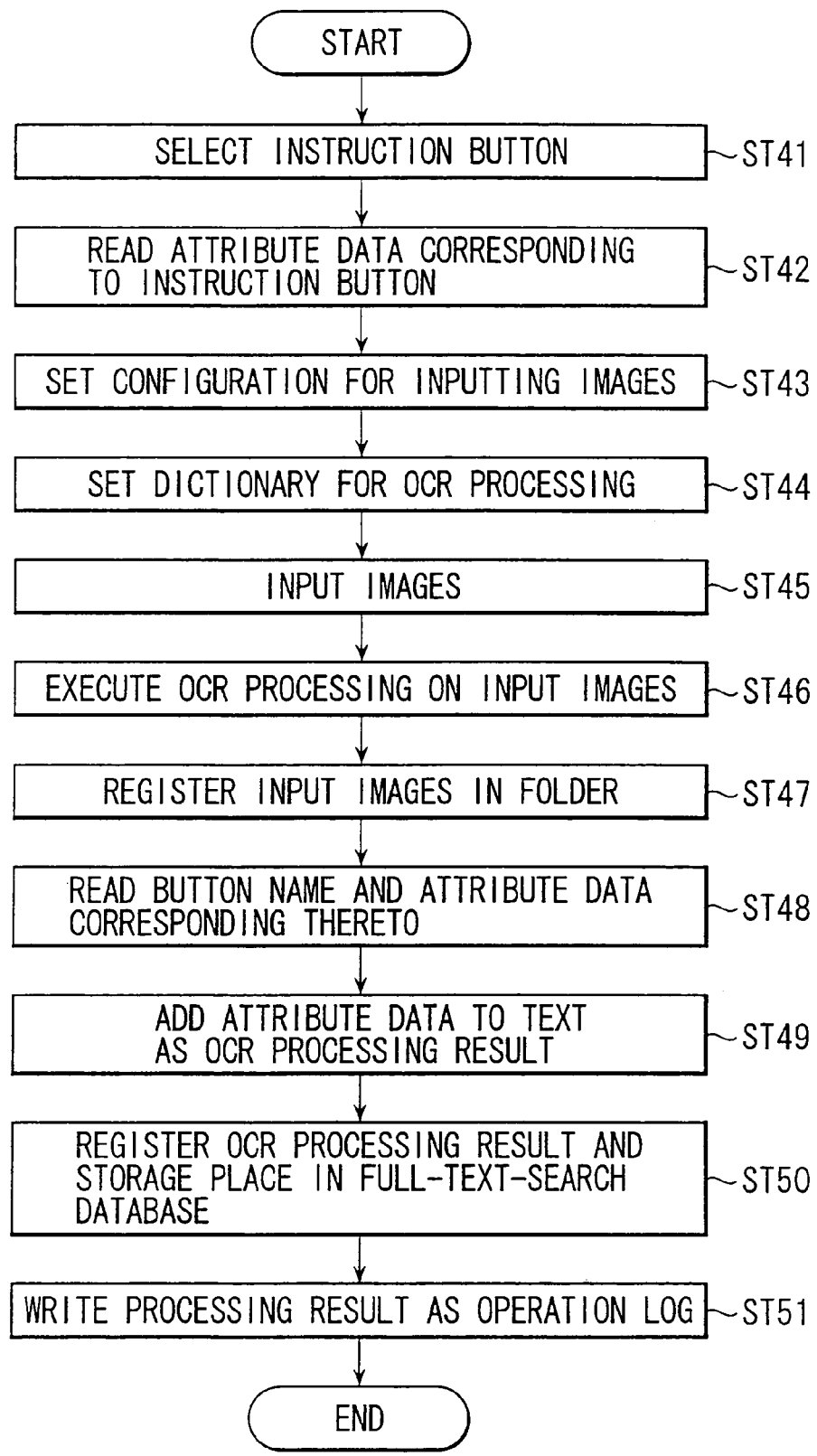
FIG. 13 is a flowchart illustrating the flow of processing executed in the fourth embodiment of the invention.

FIG. 13 is a flowchart useful in explaining the flow of processing executed in the fourth embodiment.

First, the user designates the name of a panel to which a to-be-used instruction button belongs. Then, the instruction buttons that belong to the panel designated by the user through the touch panel 14a of the display 14 are displayed. The user selects one of the instruction buttons on the display (step ST41). Subsequently, the control section 11 reads attribute data corresponding to the selected instruction button from the management table 15a of the management section 15 (step ST42).

The control section 11 then sets a configuration for inputting images on the basis of data read from the management table 15a (step ST43). After the user touches the read start button, the control section 11 starts inputting of images through the image input section 12 (step ST44).

Further, the control section 11 sets a configuration (mode) for OCR processing on the basis of the set contents of the instruction button, which concern OCR processing and are read from the management table 15a of the management section 15 (step ST45). Upon inputting images, the control section 11 controls the OCR processing section 13 so as to execute OCR processing on the input images under the set OCR processing configuration (step ST46).

After finishing OCR processing on the input images, the control section 11 registers them in a folder contained in the image database 32 and designated by the selected instruction button (step ST47).

The control section 11 reads, from the management table 15a of the management section 15, the name, the attribute, etc. of the instruction button (step S48). The control section 11 adds the read button attribute to a text document resulting from OCR processing (step S49).

Subsequently, the control section 11 registers, in the full-text-search database 31, the text document resulting from OCR processing, together with information indicating the image storing place (folder) (step ST50). After registering the OCR processing result and the images, the control section 11 writes the processing result as an operation log into the management section 15 (step ST51), and finishes the process related to the selected instruction button.

As described above, in the fourth embodiment, the set contents of the selected instruction button displayed on the display 14 of the network scanner 1, such as the name of the instruction button, the name of the display screen displaying the instruction button, or the name of the user, are registered in the full-text-search database together with a text as a character recognition result.

Thus, not only text data resulting from OCR processing executed on a to-be-registered document, but also various data items and/or set values relating to the document are registered in the full-text-search database. This increases information that can be used as a clue to a to-be-retrieved document, and hence enhances the efficiency of full text searching.

A fifth embodiment will be described.

The fifth embodiment is characterized in that all recognition candidates used during OCR processing are registered in the full-text-search database 31, instead of the final OCR processing result. This enhances the probability of retrieval of a desired document and is therefore advantageous where there is a recognition error during OCR processing. Accordingly, the efficiency of full text searching is further enhanced.

In the fifth embodiment, the OCR processing section 13 is supposed to have a function of executing OCR processing, and a function of executing sentence analysis on the recognition result of OCR processing. In the sentence analysis, candidates other than the recognition result of OCR processing are selected by comparing, for example, each word or sentence with that recited in a dictionary (not shown). For example, when the dictionary contains a more probable word than that included in the OCR processing recognition result, it is selected as a candidate resulting from the sentence analysis.

Figure 14:
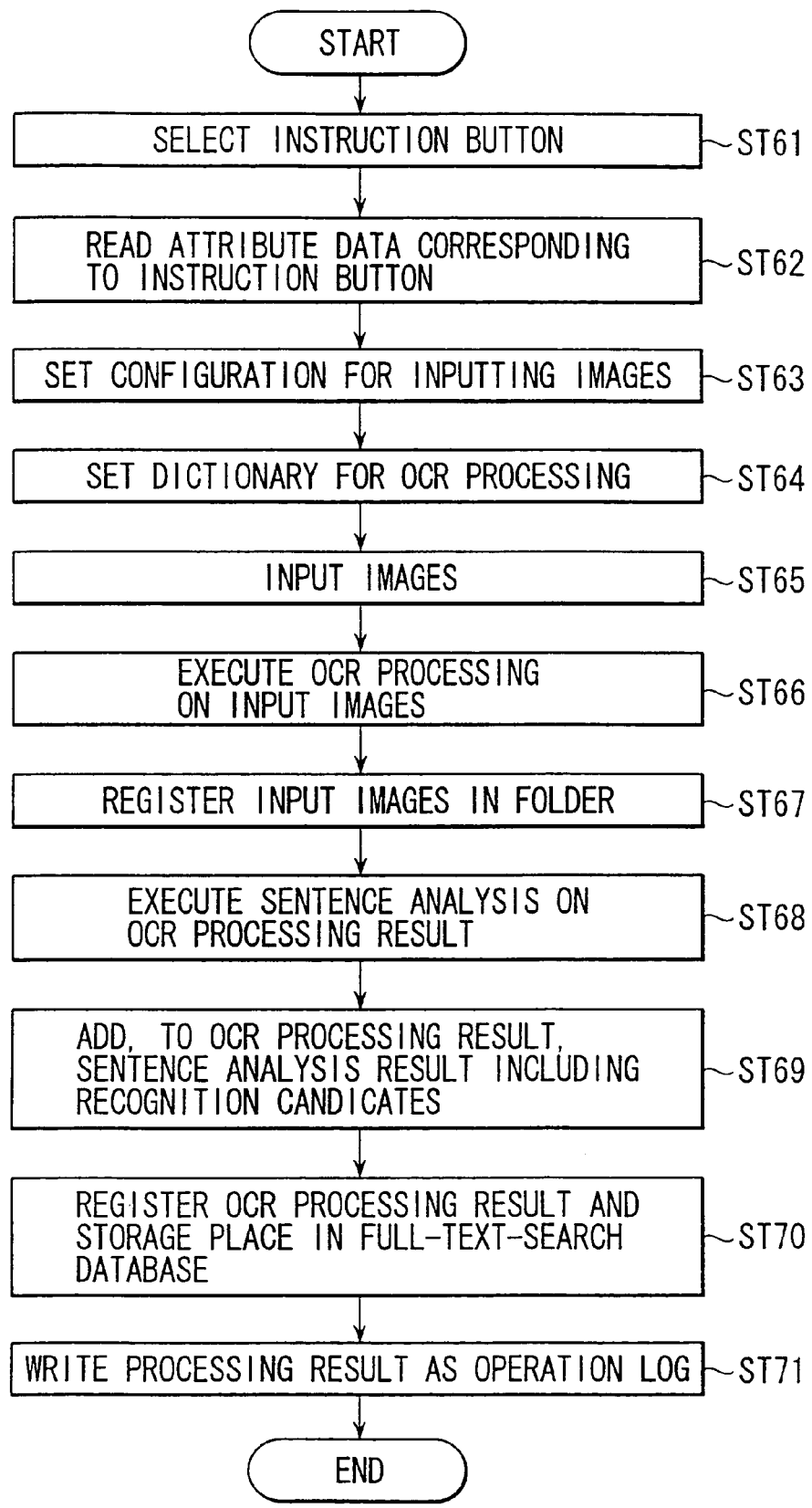
FIG. 14 is a flowchart illustrating the flow of processing executed in the fifth embodiment of the invention.

FIG. 14 is a flowchart useful in explaining the flow of processing executed in the fifth embodiment.

First, the user designates the name of a panel to which a to-be-used instruction button belongs. Then, the instruction buttons that belong to the panel designated by the user through the touch panel 14a of the display 14 are displayed. The user selects one of the instruction buttons on the display (step ST61). Subsequently, the control section 11 reads attribute data corresponding to the selected instruction button from the management table 15a of the management section 15 (step ST62).

The control section 11 then sets a configuration for inputting images on the basis of data read from the management table 15a (step ST63). After the user touches the read start button, the control section 11 starts input of images through the image input section 12 (step ST64).

Further, the control section 11 sets a configuration (mode) for OCR processing on the basis of the set contents of the instruction button, which concern OCR processing and are read from the management table 15a of the management section 15 (step ST65). Upon inputting images, the control section 11 controls the OCR processing section 13 so as to execute OCR processing on the input images under the set OCR processing configuration (step ST66).

After finishing OCR processing on the input images, the control section 11 registers them in a folder contained in the image database 32 and designated by the selected instruction button (step ST67).

The control section 11 controls the OCR processing section 13 so as to further execute, at the step S66, sentence analysis on the OCR processing result (step ST68). After finishing the sentence analysis, the control section 11 adds a plurality of recognition candidates obtained by the sentence analysis, a text document resulting from OCR processing (step S69).

Subsequently, the control section 11 registers, in the full-text-search database 31, the text document resulting from OCR processing, together with information indicating the image storing place (folder) (step ST70). After registering the OCR processing result and the images, the control section 11 writes the processing result as an operation log into the management section 15 (step ST71), and finishes the process related to the selected instruction button.

As described above, in the fifth embodiment, sentence analysis is executed on an OCR processing result, then a character string including conversion candidates (recognition candidates) is added to a text document as an image recognition result, and the resultant text document is registered in the full-text-search database.

Thus, the efficiency of full text searching is enhanced by executing fuzzy registration in the full-text-search database.

In other words, full text searching is executed even on a plurality of recognition candidates, thereby enhancing the efficiency of data retrieval.

A sixth embodiment will be described.

The sixth embodiment is characterized in that when reading a plurality of documents at one time, information indicating the end of each document (separator information, a page separator) is detected, and then an area or a character used as a page separator indicating the end of each document is erased. The page separator is used to enable automatic recognition of each document end, and is not necessary for full text search of each document. Unnecessary information can be removed from document images by erasing the page separator therefrom, which enhances the efficiency of full text searching.

In the sixth embodiment, the OCR processing section 13 is supposed to have a function of recognizing the page separator. The process of recognizing the page separator will be referred to as "OMR processing".

The page separator is formed of a predetermined symbol or character, or a predetermined character string recited in a predetermined area. Alternatively, a separator sheet containing predetermined contents may be used so that the entire sheet is recognized as a page separator.

When, for example, recognizing a page separator formed of a symbol specified in a predetermined area of a read image, the OCR processing section 13 recognizes the page separator if the symbol indicating the separator exists in the predetermined area. Further, when recognizing a page separator formed of a predetermined character string, the OCR processing section 13 recognizes the page separator if the character string indicating the separator is recognized as a result of OCR processing executed on a read image.

Figure 15:
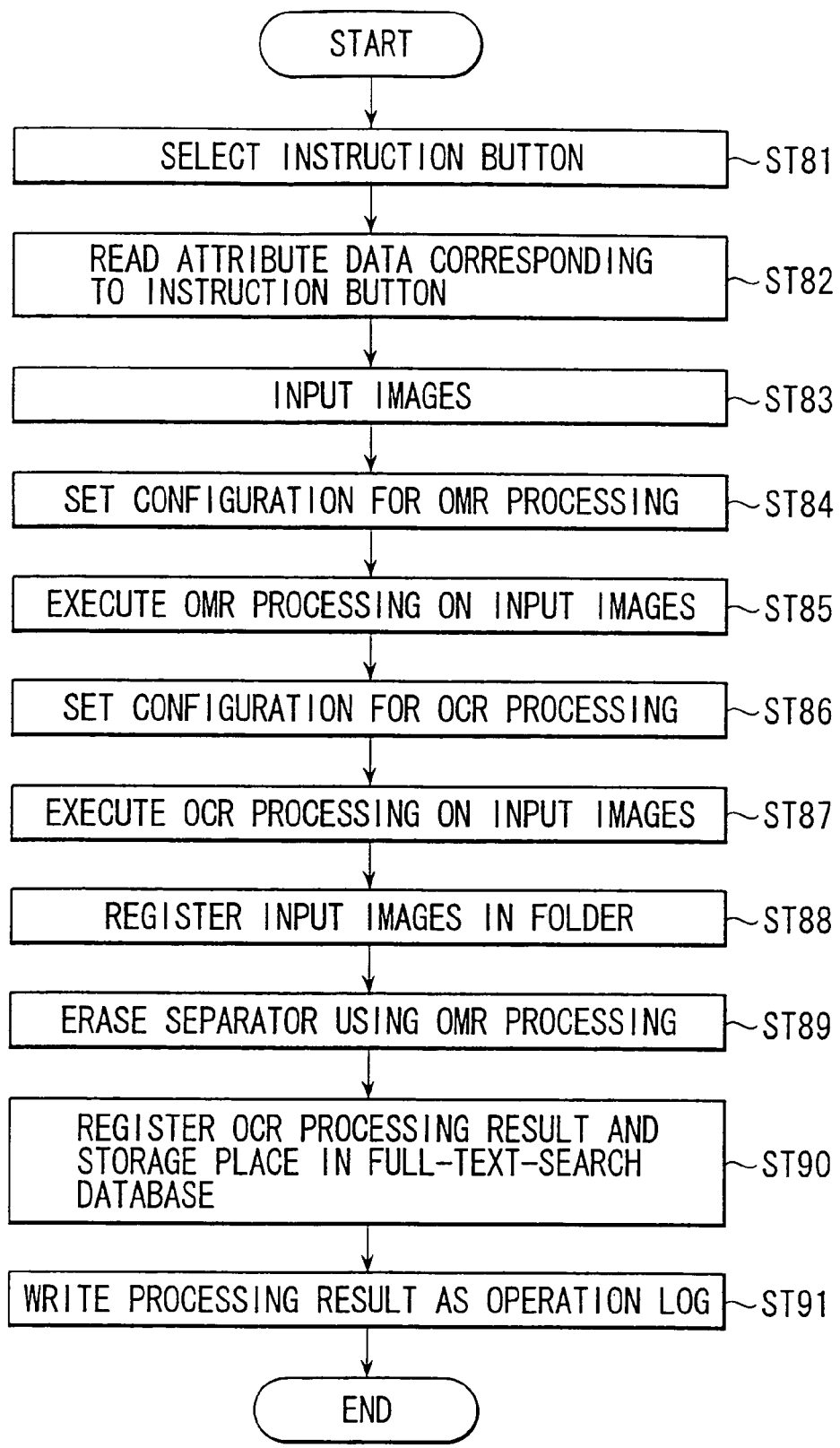
FIG. 15 is a flowchart illustrating the flow of processing executed in the sixth embodiment of the invention.

FIG. 15 is a flowchart useful in explaining the flow of processing executed in the sixth embodiment.

First, the user designates the name of a panel to which a to-be-used instruction button belongs. Then, the instruction buttons that belong to the panel designated by the user through the touch panel 14a of the display 14 are displayed. The user selects one of the instruction buttons on the display (step ST81). Subsequently, the control section 11 reads attribute data corresponding to the selected instruction button from the management table 15a of the management section 15 (step ST82).

The control section 11 then sets a configuration for inputting images on the basis of data read from the management table 15a. After the configuration for inputting images is set and the user touches the read start button, the control section 11 starts input of images through the image input section 12 (step ST83).

After starting the input of the images, the control section 11 sets a configuration (mode) for processing (OMR processing) for recognizing a page separator using the OCR processing section 13 (step ST84). After setting the configuration for OMR processing, the control section 11 controls the OCR processing section 13 so as to execute OMR processing on the images input through the image input section 12 (step ST85).

Then, the control section 11 sets a configuration for OCR processing on the basis of the set contents of the instruction button concerning OCR processing and read from the management table 15a of the management section 15 (step ST86). The control section 11 controls the OCR processing section 13 so as to execute OCR processing on the input images under the set OCR processing configuration (step ST87).

After finishing OCR processing on the input images, the control section 11 registers them in a folder contained in the image database 32 and designated by the selected instruction button (step ST88).

Where the page separator is formed of a figure or a symbol specified in a predetermined area, the area recognized as the page separator by OMR processing is painted with a background color (i.e. the area is erased). Further, where the page separator is formed of a predetermined character string (a key character string), the key character string recognized as the page separator by OMR processing is erased (step ST89).

Subsequently, the control section 11 registers, in the full-text-search database 31, the text document resulting from OCR processing, together with information indicating the image storing place (folder) (step ST90). After registering the OCR processing result and the images, the control section 11 writes the processing result as an operation log into the management section 15 (step ST91), and finishes the process related to the selected instruction button.

As described above, in the sixth embodiment, an instruction button is set for inputting an instruction to divide, into two steps as follows, OCR processing executed after one scan operation, and then to execute the two steps simultaneously.

Step 1: To determine a document range (page range) from scanned images and execute OMR processing for automatic division (separator detection and document page division).

Step 2: To erase separator information for OMR processing from each document image resulting from OMR processing, and then to extract a search key (including a full text search key) and execute OCR processing for registration.

A key character string used at the step 1 for recognizing the first page of each document, i.e. information indicating the page separator, is erased at the step 2, thereby registering the OCR processing result in the full-text-search database.

Since information irrelevant to the contents of each document is erased and hence not registered in a database, the efficiency of full text searching is enhanced.

A seventh embodiment will be described.

The seventh embodiment is characterized in that the confirmation printing function for a scanned image is applied to confirmation of an OCR processing result such that the OCR processing result is printed as one page to be added to scanned document images. In the seventh embodiment, a device having a printer section, as shown in FIG. 2, is supposed to be used.

Figure 16:
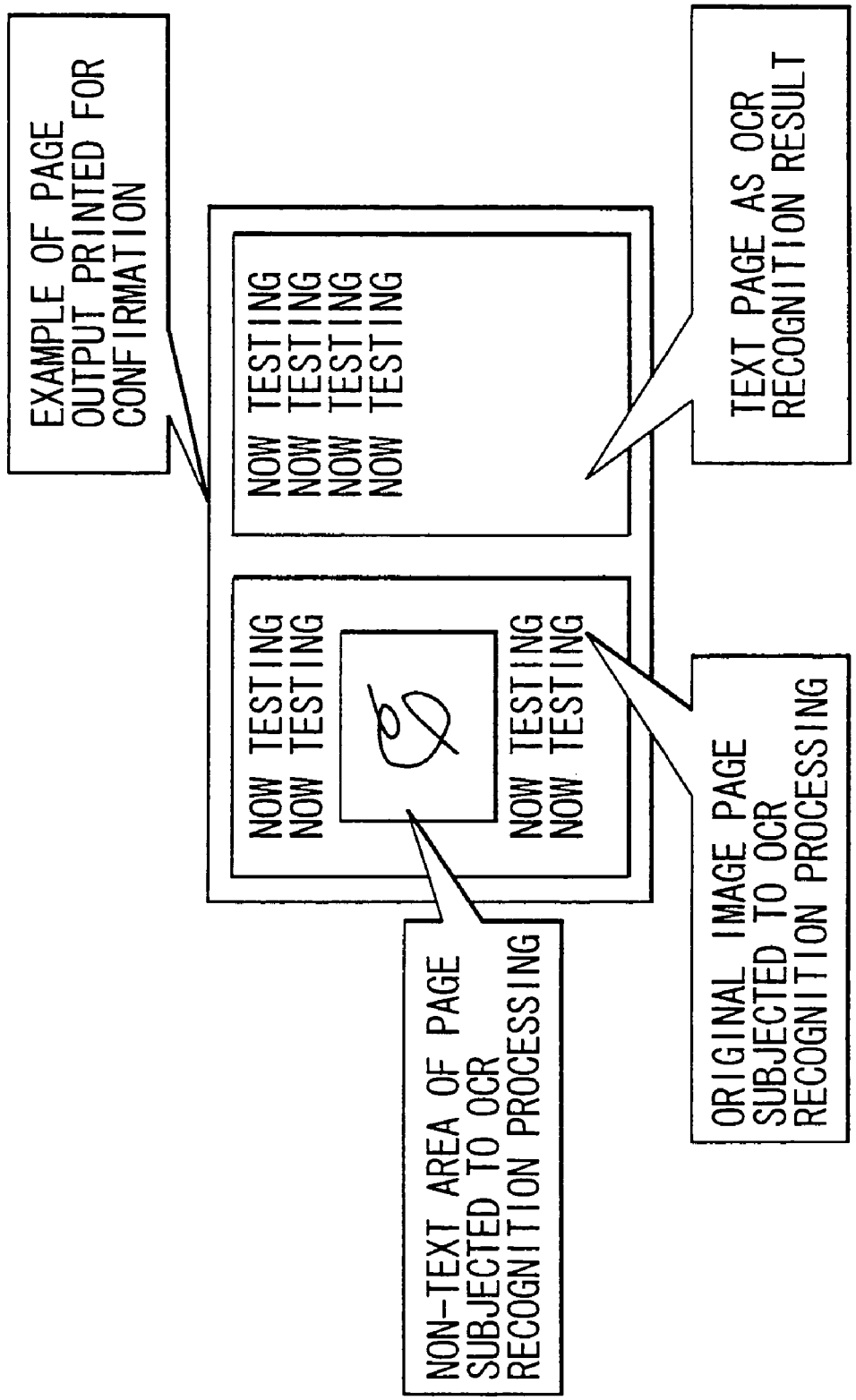
FIG. 16 is a view illustrating an example of a printed page for confirming a processing result.

FIG. 16 shows an example of a confirmation printing result obtained by printing a processing result by a printer section 16 for confirmation.

As shown in FIG. 16, in a confirmation printing result of a processing result, a scanned document image is printed on a left-hand portion of a printing medium, and a text obtained as a character recognition result of the left-hand portion is printed on a right-hand portion of the printing medium. Thus, a network scanner or a digital copy machine, which does not have a function of displaying an image immediately after the image is scanned, can confirm, by printing, the scanned image and its OCR processing result. This is very advantageous since it can be determined, for example, whether or not the image must be input again, immediately after it is scanned.

Figure 17:
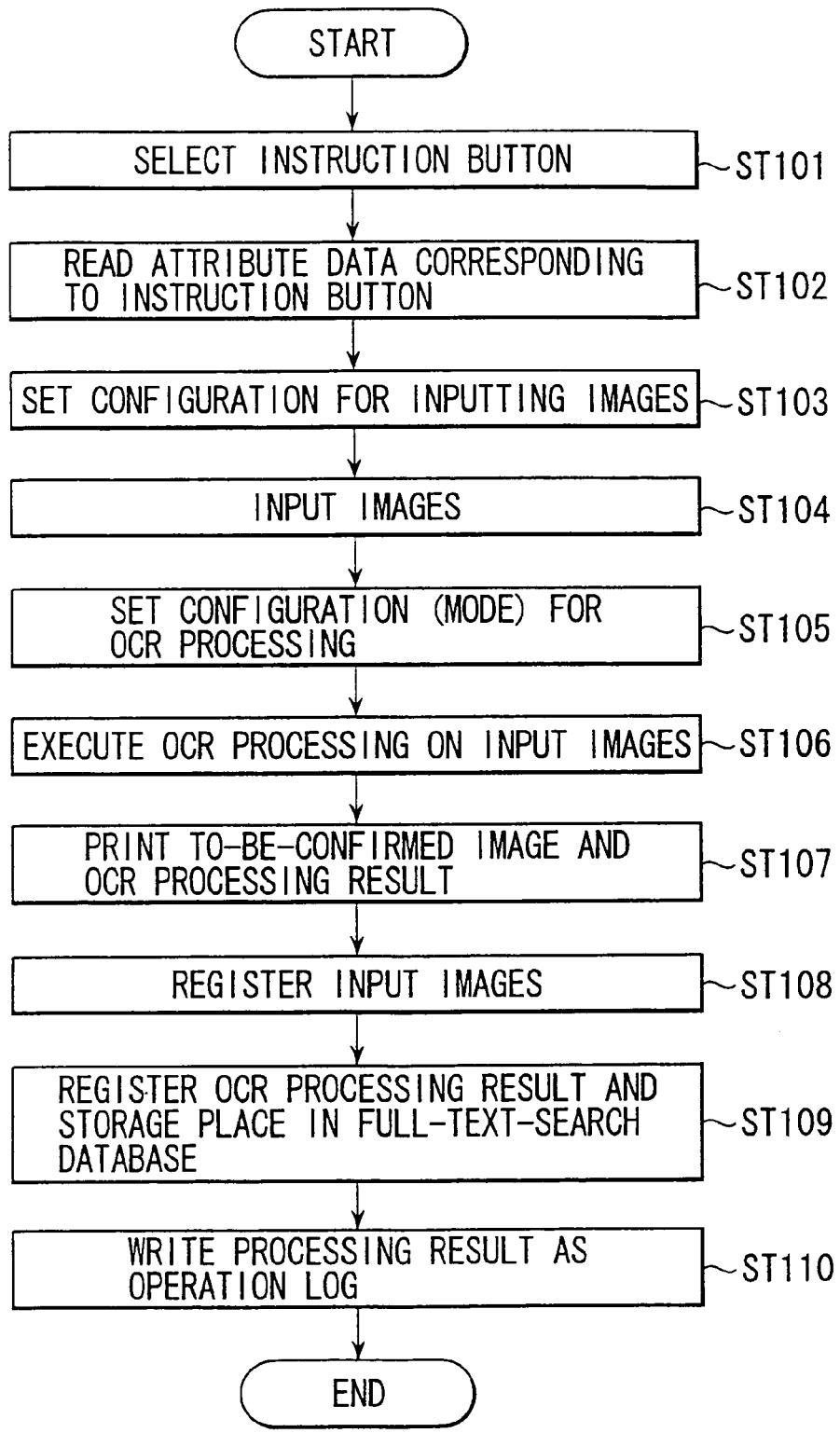
FIG. 17 is a flowchart illustrating the flow of processing executed in the seventh embodiment of the invention.

FIG. 17 is a flowchart useful in explaining the flow of processing executed in the seventh embodiment.

First, the user designates the name of a panel to which a to-be-used instruction button belongs. Then, the instruction buttons that belong to the panel designated by the user through the touch panel 14a of the display 14 are displayed. The user selects one of the instruction buttons on the display, which designates confirmation printing (step ST101). Subsequently, the control section 11 reads attribute data corresponding to the selected instruction button from the management table 15a of the management section 15 (step ST102).

The control section 11 then sets a configuration for inputting images on the basis of data read from the management table 15a (step ST103). After the user touches the read start button, the control section 11 starts input of images through the image input section 12 (step ST104).

Further, the control section 11 sets a configuration (mode) for OCR processing on the basis of the set contents of the selected instruction button, which concern OCR processing and are read from the management table 15a of the management section 15 (step ST105). Upon inputting images, the control section 11 executes OCR processing on the input images under the set OCR processing configuration (step ST106).

After finishing OCR processing on the input images, the control section 11 prints, on a paper sheet, a to-be-confirmed image and a text resulting from OCR processing, using a printer section 17 (step ST107).

Then, the control section 11 registers the images in a folder contained in the image database 32 and designated by the selected instruction button (step ST108). Subsequently, the control section 11 registers, in the full-text-search database 31, the text document resulting from OCR processing, together with information indicating the image storing place (folder) (step ST109).

After registering the OCR processing result and the images, the control section 11 writes the processing result as an operation log into the management section 15 (step ST110), and finishes the process related to the selected instruction button.

As described above, the device of this embodiment has a function of executing confirmation printing of a scanned image, and prints a document image and a text resulting from OCR processing on the image when executing confirmation printing.

This function enables a network scanner or a digital copy machine, which does not have a function of displaying an image immediately after scanning it, to immediately confirm the scanned image and its OCR processing result by printing. As a result, the necessary, for example, of re-input of the scanned image can be determined instantaneously.

An eighth embodiment will be described.

Figure 18:
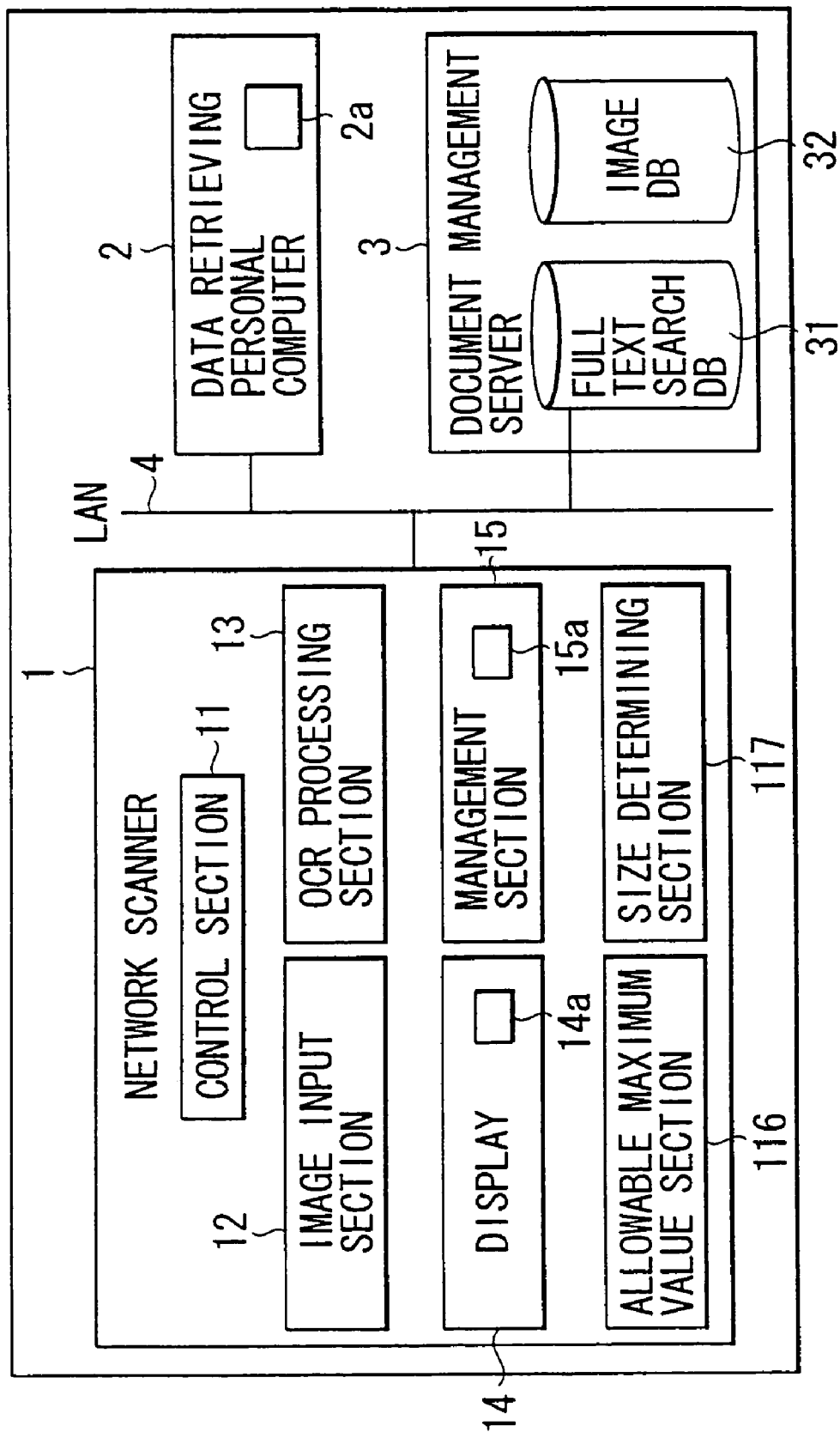
FIG. 18 is a schematic block diagram illustrating another network system according to the first to seventh embodiments of the invention.
Figure 19:
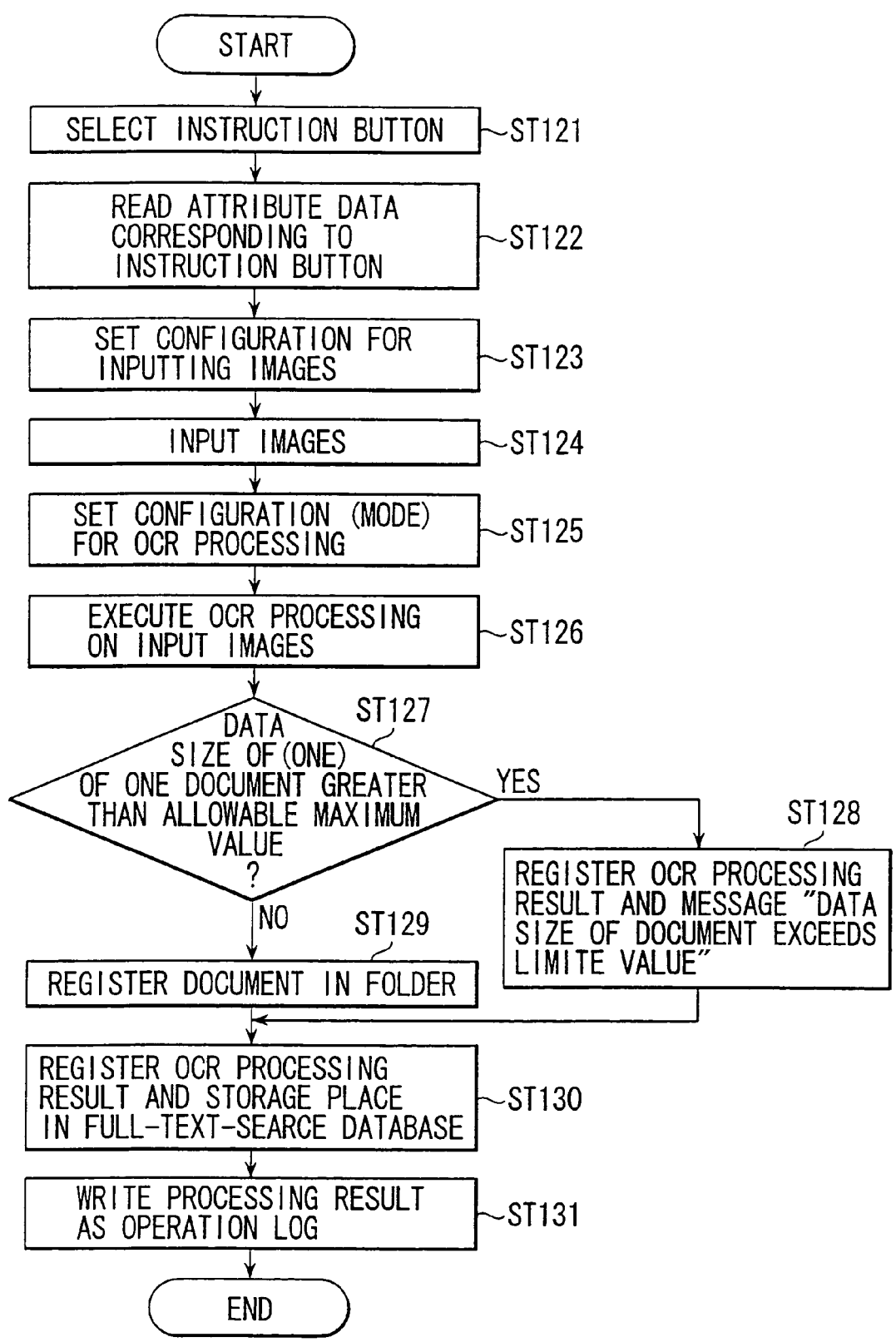
FIG. 19 is a flowchart illustrating the flow of processing executed in an eighth embodiment of the invention.

In the eighth embodiment, the network scanner 1 is supposed to have an allowable maximum value section 116 for managing a maximum scanning data amount for each document, and a size determining section 117 for determining whether or not a scanned document image exceeds a predetermined allowable value, as is shown in FIG. 18.

A digital copy machine as the network scanner 1 employed in the eighth embodiment can be used freely by the user to scan a document and transfer electronic data indicating the document to another device on the network. The user may use the machine to scan a large amount of image data and transfer a large amount of data to the network, thereby adversely influencing the entire network. To prevent this, it is very useful to employ a function of in advance setting a maximum scan data amount for each document.

However, when, in this case, the data amount exceeds the maximum allowable value, it is necessary to, for example, re-scan a document. In light of this, a more efficient operation system is required.

To meet the requirement, the eighth embodiment is characterized in that when image data amount on each scanned document exceeds the maximum allowable value, only text data resulting from OCR processing executed on the image data is registered, and a message "the image data itself was not registered since the image data amount exceeded the maximum allowable value" is stored as an operation log in the management section 15.

As shown in FIG. 18, in this network system, the allowable maximum value section 116 manages the maximum data amount for each document to be scanned by the network scanner 1, and the size determining section 117 determines whether or not the data size of each scanned document exceeds the maximum data amount managed by the maximum value section 116.

Moreover, the network scanner 1 stores, in the management section 15, an operation log indicating a processing result each time processing corresponding to one instruction terminates. The operation log includes a date item, an event level item and an operation contents item as shown in FIG. 20.

In the data item, a date at which certain process was executed is stored. In the event level item, "NORMAL TERMINATION" is written when the certain process terminated normally, and "WARNING", for example, which indicates a certain error level, is written when the certain process terminated erroneously.

In the operation contents item, the contents of the executed process are stored. When the process terminated normally, a message, for example, "a document was registered in the BUSINESS DAILY REPORT (YAMADA)", is stored, which indicates the contents of the process. On the other hand, when the process terminated erroneously, a message, for example, "only the OCR processing result was registered in the BUSINESS DAILY REPORT (YAMADA) since the input image size exceeded an allowable size (2MB)" is stored, which indicates the contents of an error and the contents of a process executed for the error.

Thus, when the data size of each document has exceeded the maximum data value managed by the maximum value section 116, the control section 11 stores the contents of the error as an operation log in the management section 15, as is shown in FIG. 20. This operation log enables the user to confirm the contents of the process later.

FIG. 15 is a flowchart useful in explaining the flow of processing executed in the eighth embodiment.

First, the user designates the name of a panel to which a to-be-used instruction button belongs. Then, the instruction buttons that belong to the panel designated by the user through the touch panel 14a of the display 14 are displayed. The user selects one of the instruction buttons on the display (step ST121). Subsequently, the control section 11 reads attribute data corresponding to the selected instruction button from the management table 15a of the management section 15 (step ST122).

The control section 11 then sets a configuration for inputting images on the basis of data read from the management table 15a (step ST123). After the user touches the read start button, the control section 11 starts inputting of images through the image input section 12 (step ST124).

Further, the control section 11 sets a configuration (mode) for OCR processing on the basis of the set contents of the instruction button, which concern OCR processing and are read from the management table 15a of the management section 15 (step ST125). Upon inputting images, the control section 11 controls the OCR processing section 13 so as to execute OCR processing on the input images under the set OCR processing configuration (step ST126).

The control section 11 controls the size determining section 117 so as to determine whether or not the data size of each document exceeds the maximum allowable value (step ST127). If the control section 11 determines that the data size exceeds the maximum allowable value, it registers, in a folder designated by the selected instruction button, a message "the input document data size has exceeded the limit value" and the OCR processing result (step ST128). If, on the other hand, the control section 11 determines that the data size does not exceed the limit value, it registers the document images in a folder contained in the image database 32 and designated by the selected instruction button (step ST129).

Subsequently, the control section 11 registers, in the full-text-search database 31, a text document resulting from OCR processing, together with information indicating the image storing place (folder) (step ST130). After registering the OCR processing result and the images, the control section 11 writes the processing result as an operation log into the management section 15 (step ST131), and finishes the process related to the selected instruction button.

As described above, where the data size of scanned images exceeds a predetermined allowable value, the images are not registered and only a text as a recognition result is registered. Further, the contents of this process are stored as an operation log.

As a result, when the data size of the images is too big and hence they cannot be registered, only text data is registered as required minimum data, which makes re-inputting of the images unnecessary.

Thus, the present invention can more facilitate the operation of the system by the user and can enhance the performance of OCR processing, the system being configured to use a network scanner that includes a scanner function incorporated in a digital copy machine, and to manage document images by registering them in a document managing server, together with the result of OCR processing executed on them.

Further, in this invention, scanned document images are subjected to OCR processing and registered in a folder which is contained in an image management database for managing images using a folder structure, and which is designated by the user. At the same time, the OCR processing result of the images is registered in a full-text-search database. The images can be retrieved from each of the image management database and the full-text-search database.

Furthermore, in this invention, the user prepares instruction buttons, before inputting document images, for designating a language, a character pitch, a field to which a to-be-scanned document belongs (address data, medical practice information, etc.) in order to enhance the effects of OCR processing executed on the images (such as the rate or processing, the rate of recognition of characters by automatic selection of a special dictionary prepared for the recognition). These instruction buttons are displayed on a display and selectively used before the images are input.

Also, in this invention, data related to OCR processing and the registration destination (a server, a folder, etc.) of each document can be simultaneously designated by a single panel button. Accordingly, the user can set all processes necessary for a to-be-scanned document simply by selecting one of buttons on the display when using the scanner.

Although, in the system structure shown in FIG. 1, 2 or 8, the network scanner 1 is physically separated from the document management server 3 but interactively connected thereto by a certain network, the function of the server 3 may be incorporated in the network scanner 1.

As described above in detail, the invention can provide an information input device for the user easy to use and capable of efficiently retrieving a registered document image with maximum character recognition accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information input device comprising:
an image inputting section which inputs images on each of documents;
a character recognition section which subjects, to character recognition processing, the images input by the image inputting section;
a display section which displays various types of instruction buttons;
a management section which manages set contents corresponding to each of the instruction buttons displayed on the display section, the set contents including the destination of registration of the images input by the image inputting section, the contents of processing executed on the images by the character recognition section, and a range of processing executed by the character recognition section; and
a control section which executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on those of the input images which are contained within the range of processing, and simultaneously registering the input images and a result of character recognition processing executed on the input images contained within the range of processing, wherein:
the management section manages the set contents corresponding to said one of the instruction buttons, the set contents including the destination of registration of the images input by the image inputting section, the contents of processing executed on the input images by the character recognition section, and processing conditions corresponding to types of the documents; and
the control section executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on the input images under the processing conditions, and simultaneously registering the input images and a result of character recognition processing executed on the input images.

2. The information input device according to claim 1, wherein the processing conditions corresponding to types of the documents include designation of a dictionary to be used for character recognition processing.

3. The information input device according to claim 1, further comprising a memory which accumulates an image transmitted from an external device, and wherein
the character recognition section subjects, to character recognition processing, the images input by the image inputting section or the image accumulated in the memory; and
the control section executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on images obtained by attaching the image accumulated in the memory to the input images, and simultaneously registering the images obtained by attaching the image accumulated in the memory to the input images, and a result of character recognition processing.

4. The information input device according to claim 1, wherein control section executes control, when one of the instruction buttons has been designated, on the basis of the set contents corresponding to said one of the instruction buttons and managed by the management section, the control section controlling the image inputting section so as to input the images and determine whether or not the input images have a data size greater than an allowable limit value, controlling the character recognition section so as to execute character recognition processing on the input images, registering only a result of character recognition processing executed on the input images, without registering the input images in a destination of registration corresponding to said one of the instruction buttons if the input images have a data size greater than the allowable limit value, the control section registering the result of character recognition processing executed on the input images, and simultaneously registering the input images in the destination of registration corresponding to said one of the instruction buttons if the input images does not have a data size greater than the allowable limit value.

5. The information input device according to claim 1, wherein
the character recognition section subjects, to character recognition processing, the images input by the image inputting section, and also subjects a result of character recognition processing to sentence analysis processing for determining other recognition candidates; and
the control section executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on the input images, subjecting a result of character recognition processing to sentence analysis processing, registering the input images, and simultaneously registering the result of character recognition processing together with recognition candidates obtained by the sentence analysis processing.

6. The information input device according to claim 1, wherein
the character recognition section has a function of subjecting, to character recognition processing, the images input by the image inputting section, and a function of detecting, from the images input by the image inputting section, separator information indicating an end of said each of the documents; and
the control section executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on images on each document having an end thereof detected when the separator information is detected, registering the images on said each document after erasing the separator information from the images input by the image inputting section, and simultaneously registering a result of character recognition processing executed on the input images on said each document.

7. An information input device comprising:
an image inputting section which inputs images on each of documents;
a character recognition section which subjects, to character recognition processing, the images input by the image inputting section;
a display section which displays various types of instruction buttons;
a management section which manages set contents corresponding to each of the instruction buttons displayed on the display section, the set contents including the destination of registration of the images input by the image inputting section, the contents of Processing executed on the images by the character recognition section, and a range of processing executed by the character recognition section; and
a control section which executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on those of the input images which are contained within the range of processing, and simultaneously registering the input images and a result of character recognition processing executed on the input images contained within the range of processing,
wherein the control section executes control, when one of the instruction buttons has been designated, on the basis of the set contents corresponding to said one of the instruction buttons and managed by the management section, the control section controlling the image inputting section so as to input the images, controlling the character recognition section so as to execute character recognition processing on the input images, registering the input images, and simultaneously registering a result of character recognition processing executed on the input images, together with the set contents corresponding to said one of the instruction buttons.

8. An information input method comprising:
managing set contents corresponding to each of instruction buttons, the set contents including a destination of registration of input images, contents of character recognition processing executed on the images, and a range of character recognition processing;

inputting images according to the instruction buttons used for managing the sets contents;

executing the character recognition processing on the input images on the, basis of the set contents and the range of processing which correspond to one of the instruction buttons;

registering images input in the destination of registration corresponding to said one of the instruction buttons; and registering in a database a result of character recognition processing executed on the input images and information indicating the destination of registration of the images.

9. The information input method according to claim 8, wherein:

the set contents corresponding to said one of the instruction buttons includes the destination of registration of the input images, the contents of character recognition processing executed on the input images, and processing conditions corresponding to the input images; and the character recognition processing is executed on the basis of the contents of processing and the processing conditions which correspond to said one of the instruction buttons.

10. The information input method according to claim 9, wherein the processing conditions corresponding to the images include designation of a dictionary to be used for the character recognition processing.

11. The information input method according to claim 8, further comprising:

accumulating an image transmitted from an external device in a memory, and wherein:

the set contents corresponding to said one of the instruction buttons includes the destination of registration of the input images and the contents of character recognition processing executed on the input images; and the character recognition processing is executed on the images which is attached with the image accumulated in the memory.

12. The information input method according to claim 8, wherein:

the set contents corresponding to said one of the instruction buttons includes the destination of registration of the input images and the contents of character recognition processing executed on the input images; and the set contents corresponding to said one of the instruction buttons are registered in the database together with a result of character recognition processing executed on the input images.

13. The information input method according to claim 8, wherein:

the set contents corresponding to said one of the instruction buttons includes the destination of registration of the input images and the contents of character recognition processing executed on the input images;

the character recognition processing executes sentence analysis processing for determining other recognition candidates with respect to a result of character recognition processing executed on the input images; and the recognition candidates obtained by the sentence analysis processing are registered together with the result of recognition of character recognition processing.

14. The information input method according to claim 8, further comprising:

detecting separator information indicating an end of each of the documents from the input images, wherein:

the set contents corresponding to said one of the instruction buttons includes the destination of registration of the input images and the contents of character recognition processing executed on the input images;

the character recognition processing executes the character recognition processing on each of the images separated by the separator information when the separator information is detected from the input images;

registering each of the images separated by the separator information in the destination of registration after erasing the separator information from the input images; and registering in the data base the result of recognition of character recognition processing executed on each of the images.

15. The information input method according to claim 8, further comprising:

determining whether or not the input images have data size greater than an allowable limit value, wherein the set contents corresponding to said one of the instruction buttons includes the destination of registration of the input images and the contents of character recognition processing executed on the input images; and the input images are not registered in the destination of registration if the input images are determined to have a data size greater than the allowable limit value.

* * * * *